United States Patent
Qiu et al.

(10) Patent No.: US 11,517,819 B2
(45) Date of Patent: Dec. 6, 2022

(54) METHOD AND APPARATUS FOR SELECTING ACCESSORY IN VIRTUAL ENVIRONMENT, DEVICE, AND READABLE STORAGE MEDIUM

(71) Applicant: Tencent Technology (Shenzhen) Company Limited, Shenzhen (CN)

(72) Inventors: Meng Qiu, Shenzhen (CN); Weijian Cui, Shenzhen (CN); Jiaqi Pan, Shenzhen (CN); Shuting Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 36 days.

(21) Appl. No.: 17/017,538

(22) Filed: Sep. 10, 2020

(65) Prior Publication Data
US 2020/0406142 A1    Dec. 31, 2020

Related U.S. Application Data

(63) Continuation of application No. PCT/CN2019/098017, filed on Jul. 26, 2019.

(30) Foreign Application Priority Data

Aug. 8, 2018    (CN) .......................... 201810899065.2

(51) Int. Cl.
*A63F 13/58* (2014.01)
*A63F 13/5372* (2014.01)
(Continued)

(52) U.S. Cl.
CPC .......... *A63F 13/5372* (2014.09); *A63F 13/58* (2014.09); *G06F 3/04815* (2013.01);
(Continued)

(58) Field of Classification Search
CPC .. G06F 3/04815; A63F 13/5372; A63F 13/58; G06T 19/00; G06T 2200/24
See application file for complete search history.

(56) References Cited

U.S. PATENT DOCUMENTS

| | | | |
|---|---|---|---|
| 8,469,824 B1 * | 6/2013 | Farley | ..................... A63F 13/31 463/53 |
| 9,079,099 B1 * | 7/2015 | Murphy | ................ A63F 13/219 |

(Continued)

FOREIGN PATENT DOCUMENTS

| | | |
|---|---|---|
| CN | 106730810 A | 5/2017 |
| CN | 107291357 A | 10/2017 |

(Continued)

OTHER PUBLICATIONS

"Experience Server: One Second Switching Mirror Tips" website: https://www.iqivi.com/w_19rzmba35d.html#curid=21140948509_fc25dlec2940adf370658df2a33830fU Aug. 4, 2018.

(Continued)

*Primary Examiner* — Andrea C Leggett
(74) *Attorney, Agent, or Firm* — Morgan, Lewis & Bockius LLP

(57) ABSTRACT

This application discloses a method and apparatus for selecting an accessory in a virtual environment. The method includes: displaying a first virtual environment interface; receiving a trigger operation on an accessory switching control; displaying a candidate accessory zone in a local peripheral region of the accessory switching control according to the trigger operation; receiving a selection operation on a target gun accessory in n gun accessories; and displaying a second virtual environment interface according to the selection operation. The accessory switching control is displayed superimposed on a picture. When the trigger operation on the accessory switching control is received, the candidate accessory zone is displayed in the peripheral (Continued)

region of the accessory switching control, and the n gun accessories of the same accessory type are displayed in the candidate accessory zone.

20 Claims, 13 Drawing Sheets

(51) Int. Cl.
    *G06F 3/04815*      (2022.01)
    *G06F 3/04842*      (2022.01)
    *G06T 19/00*      (2011.01)

(52) U.S. Cl.
    CPC .......... *G06F 3/04842* (2013.01); *G06T 19/00* (2013.01); *G06T 2200/24* (2013.01)

(56) References Cited

U.S. PATENT DOCUMENTS

| | | | | |
|---|---|---|---|---|
| 9,939,234 | B1* | 4/2018 | Glauber | G01S 19/14 |
| 2006/0246968 | A1* | 11/2006 | Dyke-Wells | A63F 13/10 |
| | | | | 463/1 |
| 2009/0104990 | A1* | 4/2009 | Tsujino | A63F 13/5255 |
| | | | | 463/32 |
| 2010/0009733 | A1* | 1/2010 | Garvin | A63F 13/525 |
| | | | | 463/5 |
| 2011/0106339 | A1* | 5/2011 | Phillips | G01C 21/20 |
| | | | | 701/2 |
| 2015/0258442 | A1* | 9/2015 | Yudo | A63F 13/58 |
| | | | | 463/31 |
| 2016/0171835 | A1* | 6/2016 | Washington | G07F 17/3244 |
| | | | | 463/25 |
| 2016/0232715 | A1* | 8/2016 | Lee | A63F 13/211 |
| 2017/0252643 | A1* | 9/2017 | Chen | A63F 13/235 |
| 2017/0354864 | A1* | 12/2017 | Rogers | A63F 13/213 |
| 2018/0290060 | A1* | 10/2018 | Noss | A63F 13/46 |
| 2019/0156558 | A1* | 5/2019 | Neeter | G06T 15/205 |
| 2019/0226808 | A1* | 7/2019 | Gallery | F41G 3/2611 |
| 2019/0278369 | A1* | 9/2019 | Ballard | G06F 3/0346 |

FOREIGN PATENT DOCUMENTS

| | | |
|---|---|---|
| CN | 107694085 A | 2/2018 |
| CN | 107913520 A | 4/2018 |
| CN | 108295465 A | 7/2018 |
| CN | 108355353 A | 8/2018 |
| CN | 109045695 A | 12/2018 |
| JP | 2017201513 A | 11/2017 |

OTHER PUBLICATIONS

"Does Experience Server of Stimulation Battleground Has Car Music?" website: https://www.bilibili.com/video/av27679580?%20fromsearch&seid=2437743375312101797 Jul. 25, 2018.

Tencent Technology, ISR, PCT/CN2019/098017, dated Oct. 24, 2019, 3 pgs.

Tencent Technology, WO, PCT/CN2019/098017, dated Oct. 24, 2019, 4 pgs.

Tencent Technology, IPRP, PCT/CN2019/098017, dated Feb. 9, 2021, 5 pgs.

\* cited by examiner

METHOD AND APPARATUS FOR SELECTING ACCESSORY IN VIRTUAL ENVIRONMENT, DEVICE, AND READABLE STORAGE MEDIUM

CROSS REFERENCE TO RELATED APPLICATIONS

This application is a continuation application of PCT Patent Application No. PCT/CN2019/098017, entitled "METHOD AND APPARATUS FOR SELECTING ACCESSORY IN VIRTUAL ENVIRONMENT, AND DEVICE AND READABLE STORAGE MEDIUM" filed on Jul. 26, 2019, which claims priority to Chinese Patent Application No. 201810899065.2, entitled "METHOD FOR SELECTING ACCESSORY IN VIRTUAL ENVIRONMENT, DEVICE, AND STORAGE MEDIUM" filed on Aug. 8, 2018, all of which are incorporated by reference in their entirety.

FIELD OF THE TECHNOLOGY

Embodiments of this application relate to the field of virtual environments, and in particular, to a method and apparatus for selecting an accessory in a virtual environment, a device, and a readable storage medium.

BACKGROUND OF THE DISCLOSURE

In an application program based on a virtual environment, for example, a virtual reality (VR) application program, a third-person shooting (TPS) game, a first-person shooting (FPS) game, and a multiplayer online battle arena (MOBA) game, a user may control a virtual object to use a virtual gun to shoot a virtual item or another virtual object in the virtual environment.

Generally, the virtual gun includes some slots for fitting different gun accessories. For example, an M416 automatic rifle is usually provided with a muzzle slot, a grip slot, a cartridge slot, a buttstock slot, and a scope slot. The scope slot may be fitted with any one of a red dot scope, a holographic scope, a 2× scope, a 4× scope, and an 8× scope. Moreover, the scope slot may include a primary slot and a secondary slot. A player observes the virtual environment according to a scope fitted in the primary slot of the virtual gun, or may switch a scope in the secondary slot to the primary slot by using a switching control in a user interface (UI) and observe the virtual environment by using the switched scope.

However, when the scope is switched in the foregoing manner, only the scopes in the primary slot and the secondary slot can be switched with each other. Since the scopes include basic scopes (such as the red dot scope and the holographic scope), low-magnification scopes (such as the 2× scope and a 3× scope), high-magnification scopes (such as the 4× scope and the 8× scope), and the like, the switching manner cannot meet a requirement that a plurality of magnification scopes can be easily fitted on the virtual gun. When a magnification scope that the user requires to be fitted is not in the primary slot or the secondary slot, a virtual backpack needs to be opened for fitting. It causes complex steps and inconvenient operations, resulting in low human-computer interaction efficiency when the user switches between scopes.

SUMMARY

Embodiments of this application provide a method and apparatus for selecting an accessory in a virtual environment, a device, and a readable storage medium, to resolve a problem of low human-computer interaction efficiency when a user switches a scope. The technical solutions are as follows:

According to one aspect, a method for selecting an accessory in a virtual environment is provided, applied to a terminal, the method including:

displaying a first virtual environment interface, the first virtual environment interface including a picture of the virtual environment observed by a virtual object and an accessory switching control, and the virtual object holding a virtual gun in the virtual environment;

receiving a trigger operation on the accessory switching control;

displaying a candidate accessory zone in a local peripheral region of the accessory switching control according to the trigger operation, n gun accessories of one accessory type being displayed in the candidate accessory zone, each gun accessory being an accessory that has been obtained by the virtual object and that is used for being fitted on the virtual gun, the gun accessory being fitted in a slot corresponding to the accessory type on the virtual gun, and n being a positive integer;

receiving a selection operation on a target gun accessory in the n gun accessories; and replacing the first virtual environment interface with a second virtual environment interface according to the selection operation, the second virtual environment interface comprising a picture of the virtual environment observed by the virtual object, the virtual object holding the virtual gun, and the target gun accessory being fitted in a target slot of the virtual gun.

According to another aspect, a terminal is provided, including a processor and a memory, the memory storing a plurality of programs that, when executed by the processor, cause the terminal to implement the method for selecting an accessory in a virtual environment according to the embodiments of this application.

According to another aspect, a non-transitory computer-readable storage medium is provided, storing a plurality of programs that, when executed by a processor of a terminal, cause the terminal to implement the method for selecting an accessory in a virtual environment according to the embodiments of this application.

According to another aspect, a computer program product is provided, the computer program product, when run on a computer, causing the computer to perform the method for selecting an accessory in a virtual environment according to the embodiments of this application.

The technical solutions provided in the embodiments of this application have at least the following beneficial effects:

The accessory switching control is displayed in the first virtual environment interface. When the trigger operation on the accessory switching control is received, the candidate accessory zone is displayed in the peripheral region of the accessory switching control, and the n gun accessories of the same accessory type are displayed in the candidate accessory zone. In this way, a user may select any one of the n gun accessories to be fitted in the target slot without opening a backpack to select a to-be-selected accessory. Operation steps in the entire switching process are simple, and the human-computer interaction efficiency is relatively high when the user switches between accessories.

DESCRIPTION OF EMBODIMENTS

Figure 1:
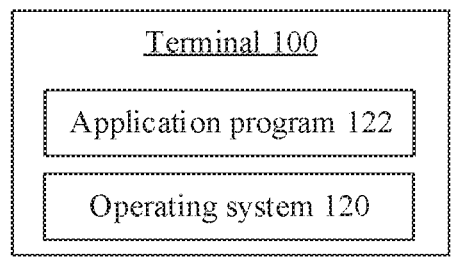
FIG. 1 is a structural block diagram of an electronic device according to an exemplary embodiment of this application.

To make the objectives, technical solutions, and advantages of this application clearer, the following further describes the implementations of this application in detail with reference to the accompanying drawings.

First, terms involved in the embodiments of this application are briefly introduced:

Virtual environment: It is a virtual environment displayed (or provided) when an application program is run on a terminal. The virtual environment may be a simulated environment of the real world, or may be a semi-simulated and semi-fictional three-dimensional environment, or may be a purely fictitious three-dimensional environment. The virtual environment may be any one of a two-dimensional virtual environment, a 2.5-dimensional virtual environment, and a three-dimensional virtual environment. In the following embodiments, descriptions are provided by using an example in which the virtual environment is a three-dimensional virtual environment, but no limitation is set thereto. Optionally, the virtual environment is further used for a battle between at least two virtual characters in the virtual environment.

Optionally, the virtual environment is further used for a battle between at least two virtual characters using virtual guns. Optionally, the virtual environment is further used for a battle between at least two virtual characters using virtual guns within a target region, the target region continuously decreasing over time in the virtual environment.

Virtual object: It is a movable object in the virtual environment. The movable object is at least one of a virtual character, a virtual animal, and an animation character. Optionally, when the virtual environment is a three-dimensional virtual environment, the virtual object is a three-dimensional model created based on an animation skeleton technology. Each virtual object has a respective shape and size in the three-dimensional virtual environment, and occupies some space in the three-dimensional virtual environment.

Virtual gun: It is a virtual weapon that attacks by firing bullets in the virtual environment. The virtual object may pick up the virtual gun in the virtual environment and attack by using the picked virtual gun. Optionally, each virtual gun may be provided with at least one slot for fitting at least one gun accessory. For example, an M416 automatic rifle is usually provided with a muzzle slot, a grip slot, a cartridge slot, a buttstock slot, and a scope slot. The scope slot may be fitted with any one of a red dot scope, a holographic scope, a 2× scope, a 4× scope, and an 8× scope. When holding the M416 automatic rifle and opening a scope, a player may observe the virtual environment magnified to a specific extent according to the scope fitted on the gun.

Accessory slot: It is a slot for fitting a gun accessory when a virtual gun is used. Optionally, a type of the accessory slot includes at least one of a muzzle accessory slot, a buttstock accessory slot, a scope slot, and a cartridge slot. For example, if a gun accessory in the accessory slot is a 4× scope, a gun accessory applied when the virtual gun is used is the 4× scope.

Gun accessories of the same type: Gun accessories are classified into different types, for example, a grip type, a muzzle type, a scope type, and a buttstock type. Each type of the gun accessories is further classified based on different models. For example, the grip type includes a vertical grip, an angle grip, a half grip, a light grip, and a thumb grip; the muzzle type includes a muzzle compensator, a flame damper, and a silencer; and the scope type includes a red dot scope, a holographic scope, a 2× scope, a 4× scope, and an 8× scope. Optionally, gun accessories of the same type are displayed in accessory selection boxes in an accessory display zone.

FIG. 1 is a structural block diagram of an electronic device according to an exemplary embodiment of this application. The electronic device 100 includes an operating system 120 and an application program 122.

The operating system 120 is basic software that provides secure access to computer hardware for the application program 122.

The application program 122 is an application program supporting a virtual environment. Optionally, the application program 122 is an application program supporting a three-dimensional virtual environment. The application program 122 may be any one of a VR application program, a three-dimensional map program, a military simulation program, a TPS game, an FPS game, a MOBA game, and a multiplayer gunfight survival game. The application program 122 may be a stand-alone application program, for example, a stand-alone 3D game program.

Figure 2:
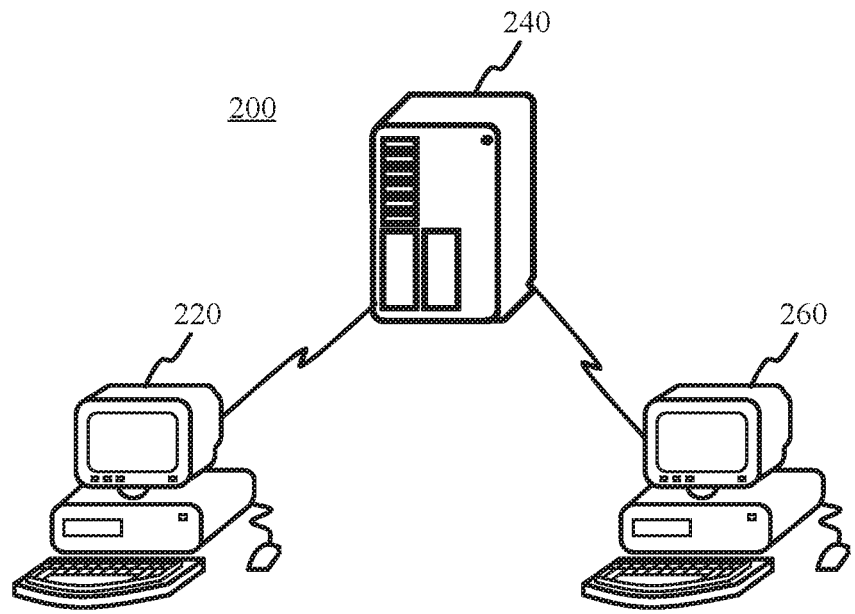
FIG. 2 is a structural block diagram of a computer system according to an exemplary embodiment of this application.

FIG. 2 is a structural block diagram of a computer system according to an exemplary embodiment of this application. The computer system 200 includes a first device 220, a server 240, and a second device 260.

An application program supporting a virtual environment is installed and run in the first device 220. The application program may be any one of a VR application program, a three-dimensional map program, a military simulation program, a TPS game, an FPS game, a MOBA game, and a multiplayer gunfight survival game. The first device 220 is a device used by a first user. The first user controls, by using the first device 220, a first virtual object in the virtual environment to move. The movement includes, but is not limited to, at least one of the following: adjusting a body posture, crawling, walking, running, riding, jumping, driving, picking, shooting, attacking, and throwing. Schematically, the first virtual object is a first virtual character, for example, a simulated character or an animation character.

The first device 220 is connected to the server 240 through a wireless network or a wired network.

The server 240 includes at least one of one server, a plurality of servers, a cloud computing platform, and a virtualization center. The server 240 is configured to provide a backend service for an application program supporting a three-dimensional virtual environment. Optionally, the server 240 is responsible for primary computing work, and the first device 220 and the second device 260 are responsible for secondary computing work. Alternatively, the server 240 is responsible for secondary computing work, and the first device 220 and the second device 260 are responsible for primary computing work. Alternatively, the server 240, the first device 220, and the second device 260 perform collaborative computing by using a distributed computing architecture.

An application program supporting a virtual environment is installed and run in the second device 260. The application program may be any one of the VR application program, the three-dimensional map program, the military simulation program, the FPS game, the MOBA game, and the multiplayer gunfight survival game. The second device 260 is a device used by a second user. The second user controls, by using the second device 260, a second virtual object in the virtual environment to move. The movement includes, but is not limited to, at least one of the following: adjusting a body posture, crawling, walking, running, riding, jumping, driving, picking, shooting, attacking, and throwing. Schematically, the second virtual object is a second virtual character, for example, a simulated character or an animation character.

Optionally, the first virtual character and the second virtual character are in the same virtual environment. Optionally, the first virtual character and the second virtual character may belong to the same team, the same organization, have a friend relationship, or have temporary communication permission. Optionally, the first virtual character and the second virtual character may alternatively belong to different teams, different organizations, or two hostile groups.

Optionally, the application programs installed in the first device 220 and the second device 260 are the same, or the application programs installed in the two devices are application programs of the same type on different control system platforms. The first device 220 may refer to one of a plurality of devices. The second device 260 may refer to one of a plurality of devices. In this embodiment, only the first device 220 and the second device 260 are used as an example for description. Device types of the first device 220 and the second device 260 are the same or different. The device types include at least one of a game console, a desktop computer, a smartphone, a tablet computer, an e-book reader, a moving picture experts group audio layer 111 (MP3) player, a moving picture experts group audio layer IV (MP4) player, and a portable laptop computer. In the following embodiments, descriptions are provided by using an example in which the device is a desktop computer.

A person skilled in the art may know that there may be more or fewer such device. For example, there may be only one such device, or there may be dozens or hundreds such device, or more. The device quantity and the device type are not limited in this embodiment of this application.

Figure 3:
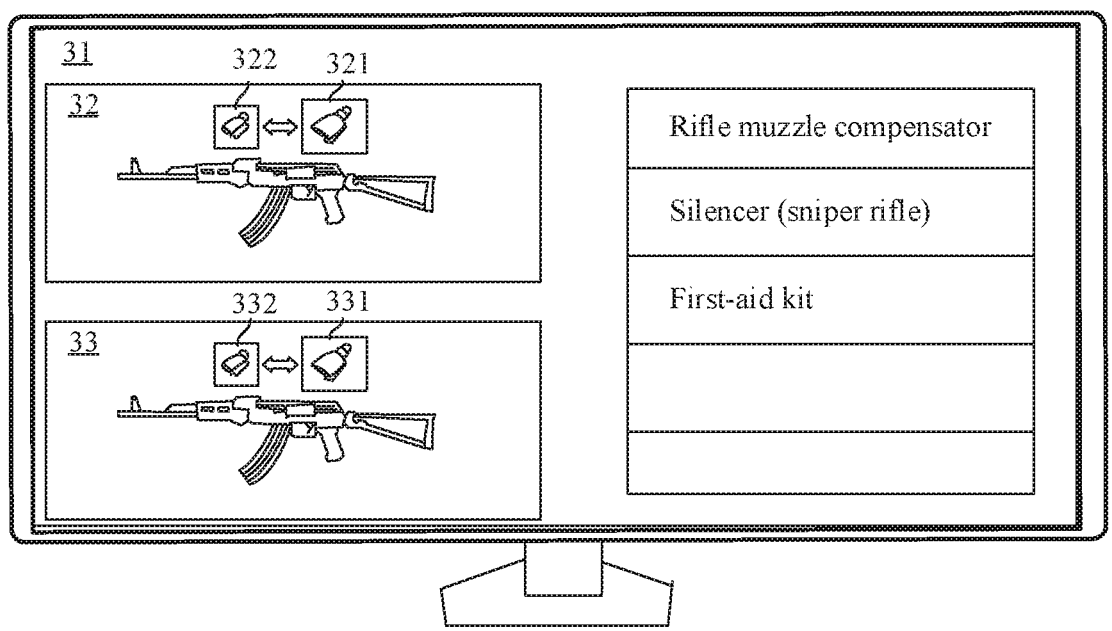
FIG. 3 is a schematic diagram of a terminal interface in the related art according to an exemplary embodiment of this application.

In the related art, which is described by using an example in which an accessory slot is a scope slot, a virtual gun is provided with a primary slot and a secondary slot. As shown in FIG. 3, a backpack presentation interface 31 includes a virtual gun 32 and a virtual gun 33. A scope 321 is fitted in a primary slot of the virtual gun 32, and a scope 322 is fitted in a secondary slot of the virtual gun 32. A scope 331 is fitted in a primary slot of the virtual gun 33, and a scope 332 is fitted in a secondary slot of the virtual gun 33.

Figure 4:
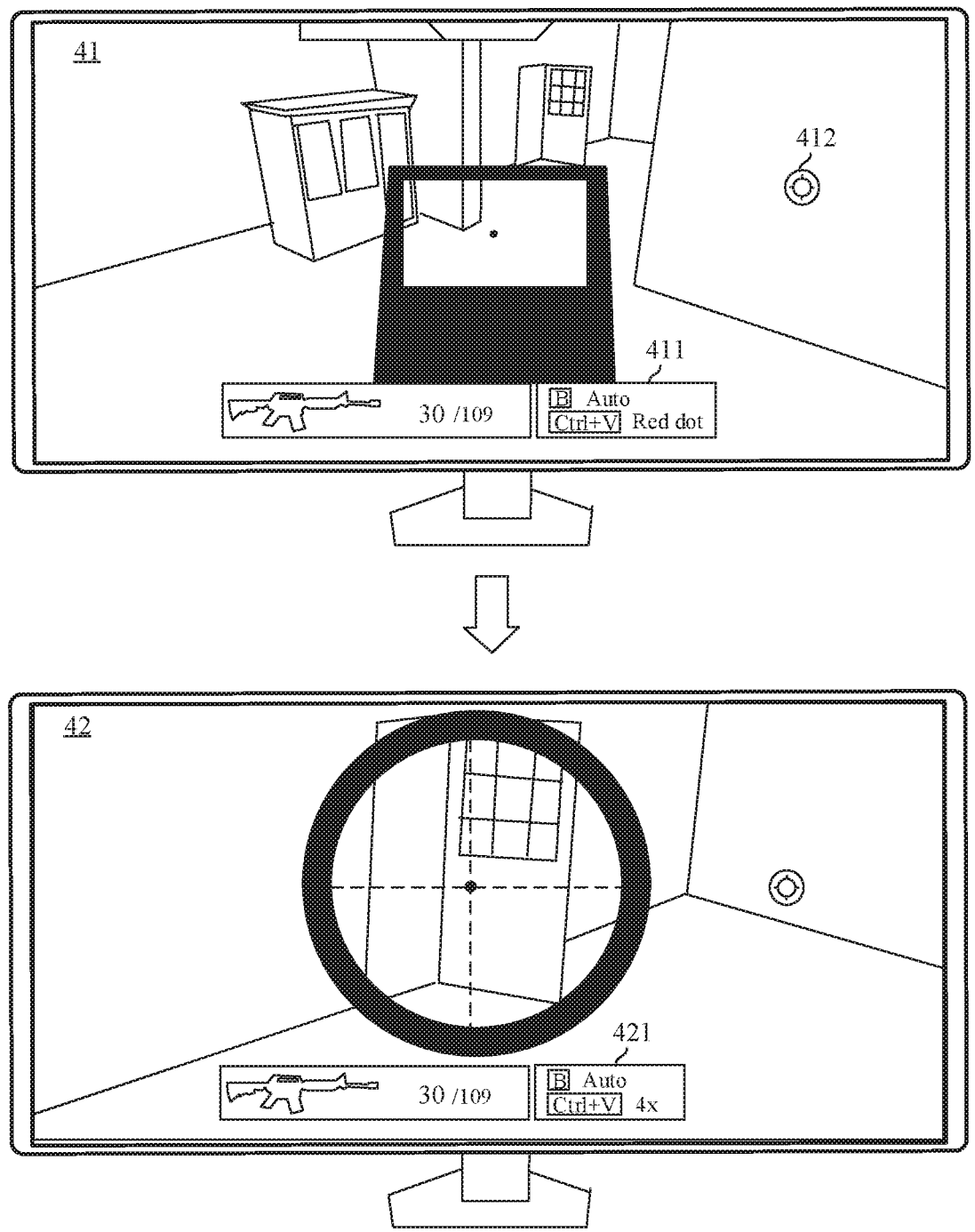
FIG. 4 is a schematic diagram of a terminal interface in the related art according to another exemplary embodiment of this application.

In a virtual battle, a user may click/tap an accessory switching control in a first virtual environment interface to switch the scopes in the primary slot and the secondary slot, to observe a virtual environment by using the scope original in the secondary slot (the scope in the primary slot after the switching). As shown in FIG. 4, a gun status bar 411 displayed in a first virtual environment interface 41 indicates that a primary scope fitted on the virtual gun is a red dot scope. The first virtual environment interface 41 includes an accessory switching control 412. After the user click/taps the accessory switching control 412, a second virtual environment interface 42 is displayed. A gun status bar 421 displayed in the second virtual environment interface 42 indicates that the primary scope fitted on the virtual gun is a 4× scope.

However, in this switching manner, the user can switch only between the primary scope and the secondary scope, and cannot switch to another scope in a backpack. When switching a scope from the backpack to the primary slot, the user needs to open the virtual backpack for fitting. It causes complex steps and inconvenient operations, resulting in low human-computer interaction efficiency when the user switches between scopes.

Figure 5:
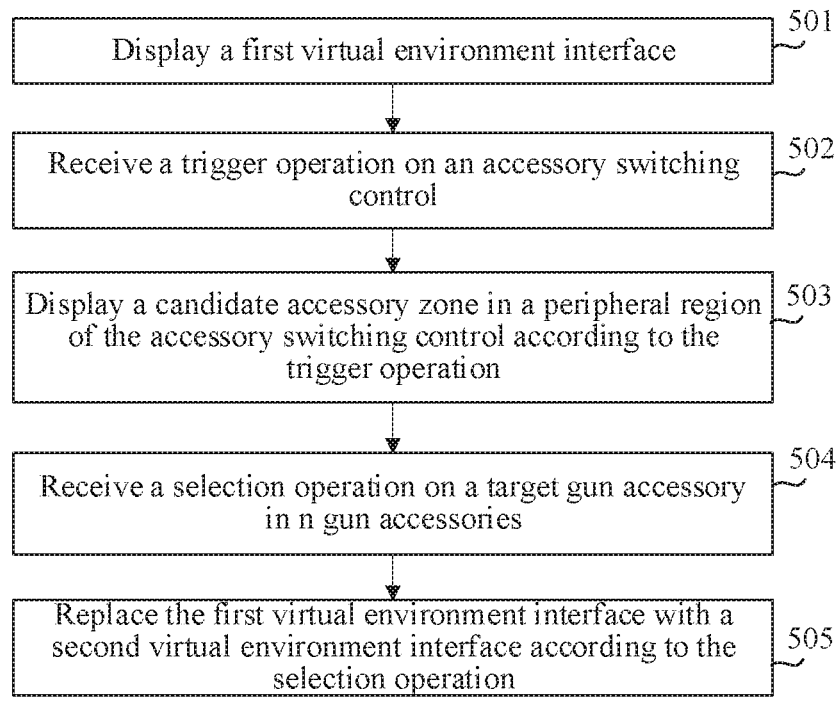
FIG. 5 is a flowchart of a method for selecting an accessory in a virtual environment according to an exemplary embodiment of this application.

A method for selecting an accessory in a virtual environment provided in the embodiments of this application is described with reference to the foregoing term explanation. Referring to FIG. 5, FIG. 5 is a flowchart of a method for selecting an accessory in a virtual environment according to an exemplary embodiment of this application. This embodiment is described by using an example in which the method is applied to a terminal. The method for selecting an accessory in a virtual environment includes the following steps:

Step 501: Display a first virtual environment interface.

Optionally, the first virtual environment interface includes a picture of the virtual environment observed by a virtual object, an accessory switching control is displayed superimposed on the picture, and the virtual object holds a virtual gun in the virtual environment.

Optionally, an application program is installed in the terminal. The application program is an application program supporting the virtual environment. Optionally, the application program may be a VR application program, a TPS game, an FPS game, a MOBA game, or the like.

Optionally, the virtual gun held by the virtual object may be directly observed through the virtual object in the first virtual environment interface. For example, the virtual gun is held at a hand position of the virtual object, and a first accessory is displayed on the virtual gun. Moreover, the virtual gun may be observed in a gun status bar displayed in the first virtual environment interface. For example, the virtual gun is displayed in the gun status bar, and the first accessory is correspondingly displayed together with the virtual gun. Alternatively, the virtual gun held by the virtual object cannot be observed through the virtual object in the first virtual environment interface. For example, the virtual object and the virtual gun are not displayed in the first virtual environment interface, but the virtual gun may be observed in the gun status bar displayed in the first virtual environment interface. Alternatively, the virtual gun held by the virtual object may be directly observed through the virtual object in the first virtual environment interface, but the gun status bar is not displayed in the first virtual environment interface, and the virtual gun cannot be observed through the gun status bar. The observation manner for the virtual gun is not limited in this embodiment of this application.

Optionally, the first virtual environment interface is an interface displayed from a first-person perspective of the virtual object, or may be an interface displayed from a third-person perspective of the virtual object. The first-person perspective is a perspective corresponding to a picture that the virtual object can observe in the virtual environment. An interface corresponding to the first-person perspective does not include the virtual object itself. For example, only arms of the virtual object and the virtual gun can be seen. The third-person perspective is a perspective to observe the virtual object through a camera model in the virtual environment. An interface corresponding to the third-person perspective includes the virtual object itself, and usually the camera model is located behind the virtual object to observe the virtual object. For example, a three-dimensional model of the virtual object and the virtual gun held by the virtual object can be seen.

Figure 6:
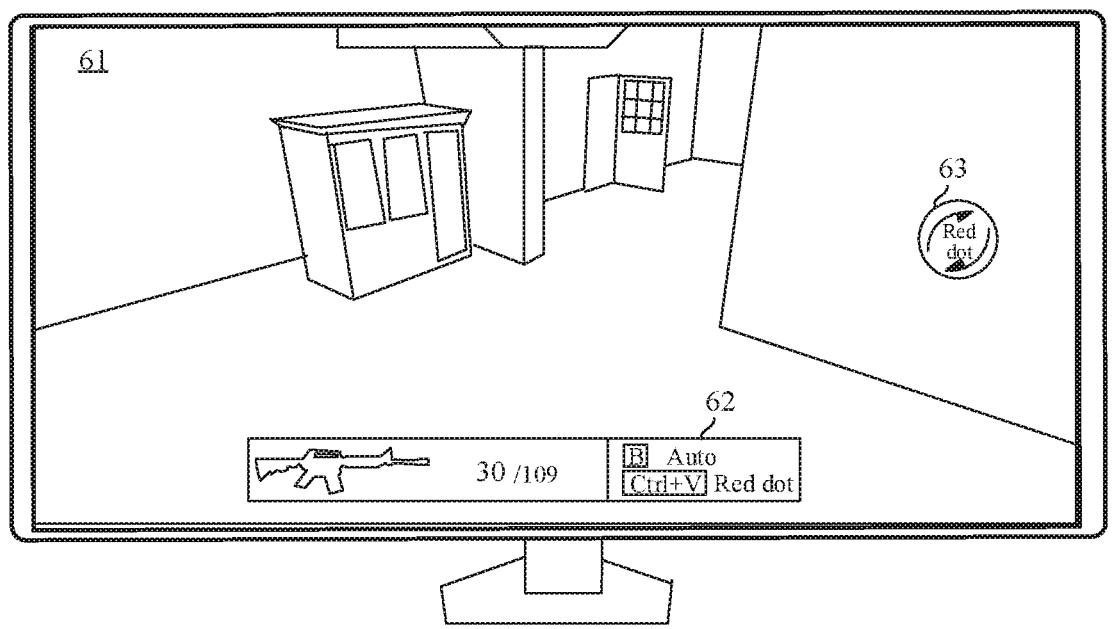
FIG. 6 is a schematic diagram of a terminal interface according to an exemplary embodiment of this application.

Optionally, when the first virtual environment interface is displayed from the first-person perspective or the third-person perspective of the virtual object, the first virtual environment interface further includes the gun status bar. A first accessory fitted on the virtual gun is displayed in the gun status bar. The first-person perspective is used as an example. FIG. 6 is a schematic interface diagram of a first virtual environment interface 61 displayed in the first-person perspective of the virtual object. As shown in FIG. 6, the first virtual environment interface 61 includes a gun status bar 62, and a first accessory "red dot" (that is, a red dot scope) fitted on the virtual gun is displayed in the gun status bar 62.

Figure 7:
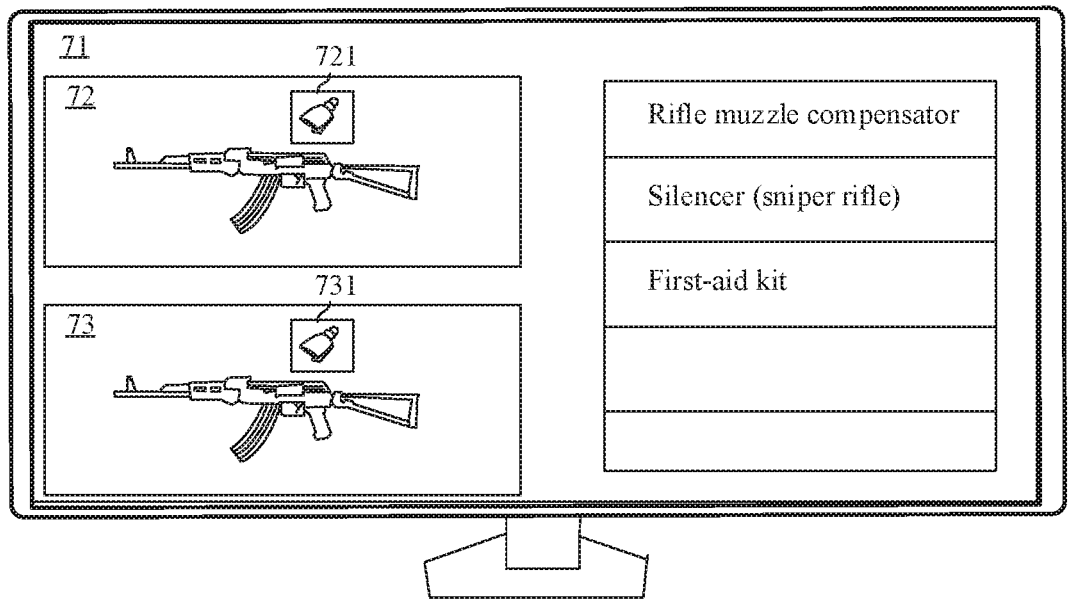
FIG. 7 is a schematic diagram of a terminal interface according to another exemplary embodiment of this application.

Optionally, when the first virtual environment interface is displayed from the first-person perspective or the third-person perspective of the virtual object, the first virtual environment interface may further include a backpack control. A shortcut key operation may trigger a backpack to be opened, and a fitting status of the virtual gun is displayed in the backpack. As shown in FIG. 7, a fitting status of a virtual gun 72 and a fitting status of a virtual gun 73 are displayed in a backpack 71 after the backpack is opened: a gun accessory 721 is fitted in a target slot of the virtual gun 72, and a gun accessory 731 is fitted in a target slot of the virtual gun 73.

Optionally, when the first virtual environment interface is displayed from the third-person perspective of the virtual object, the first virtual environment interface further includes the virtual gun, and the first accessory that is fitted is displayed on the virtual gun.

Optionally, the first virtual environment interface further includes an accessory switching control. As shown in FIG. 6, the first virtual environment interface 61 further includes an accessory switching control 63, and "red dot" is displayed on the accessory switching control 63, indicating that a scope fitted in a target slot of the virtual gun is a red dot scope.

Step 502: Receive a trigger operation on an accessory switching control.

Optionally, a manner of receiving a trigger operation includes either of the following manners:
1. receiving a click/tap operation on the accessory switching control; and
2. receiving a press operation on the accessory switching control.

Schematically, the trigger operation includes: click/tapping the accessory switching control, pressing the accessory switching control, and performing continuous operations on the accessory switching control, the continuous operations being performing a click/tap operation and then performing a press operation on the accessory switching control.

Step 503: Display a candidate accessory zone in a local peripheral region of the accessory switching control according to the trigger operation.

Optionally, n gun accessories of the same accessory type are displayed in the candidate accessory zone, the gun accessory is an accessory that has been obtained by the virtual object and that is used for being fitted on the virtual gun, and optionally, the gun accessory is fitted in a slot corresponding to the accessory type on the virtual gun, n being a positive integer.

Optionally, the local peripheral region is used for indicating that a distance between the accessory switching control and a point or a line closest to the accessory switching control in the candidate accessory zone is less than a preset distance. Schematically, when the candidate accessory zone is a sectorial area panel, an inner arc in the sectorial area panel is closest to the accessory switching control. Therefore, if a distance between the arc and the accessory switching control is less than the preset distance, the sectorial area panel is in the local peripheral region.

Optionally, when the candidate accessory zone is displayed in the local peripheral region of the accessory switching control according to the trigger operation, a sectorial area panel may be displayed in the local peripheral region according to the trigger operation by using the accessory switching control as a center. The sectorial area panel includes m candidate boxes, and the n gun accessories are displayed in n of the m candidate boxes, m≥n.

Optionally, the sectorial area panel may be on a left side of the accessory switching control, a right side of the accessory switching control, an upper side of the accessory switching control, or a lower side of the accessory switching control, or may be at any angle or position of the accessory switching control. This is not limited in this embodiment of this application.

Optionally, descriptions are provided by using an example in which the sectorial area panel is on the left side or the right side of the accessory switching control. When the accessory switching control is on a right side of a display screen of the terminal, the sectorial area panel is in a left local region of the accessory switching control, to avoid that when the sectorial area panel is displayed, a hand of a user blocks the sectorial area panel and a gun accessory displayed in the sectorial area panel cannot be determined, thereby helping the right hand of the user determine the gun accessory. Similarly, when the accessory switching control is on a left side of the display screen of the terminal, the sectorial area panel is in a right local region of the accessory switching control. When the accessory switching control is on an upper side of the display screen of the terminal, the sectorial area panel is in an upper local region of the accessory switching control. When the accessory switching control is on a lower side of the display screen of the terminal, the sectorial area panel is in a lower local region of the accessory switching control.

Figure 8:
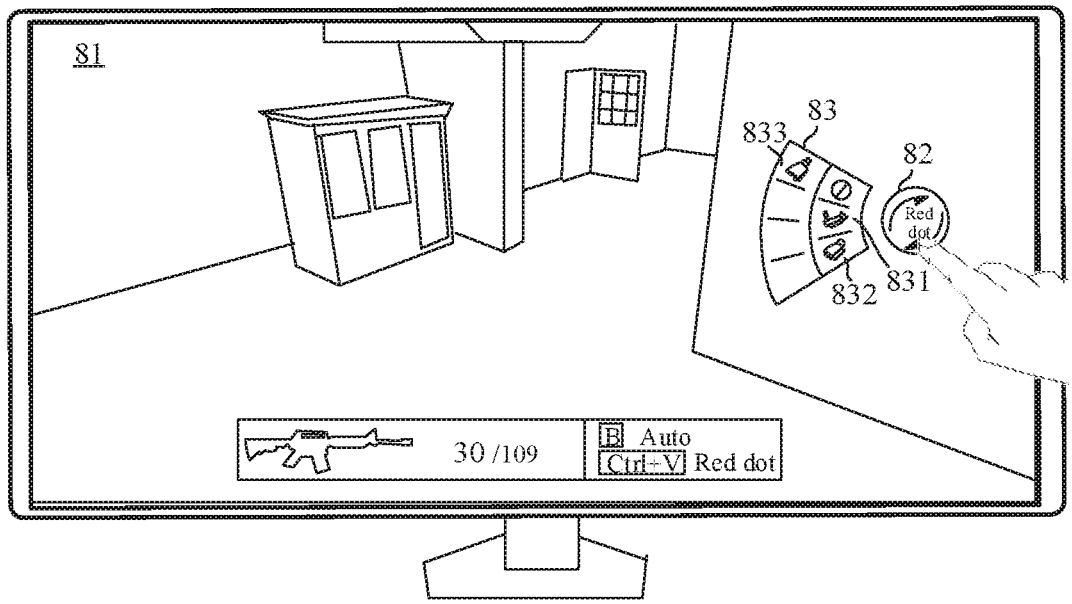
FIG. 8 is a schematic diagram of a terminal interface according to another exemplary embodiment of this application.

Schematically, referring to FIG. 8, descriptions are provided by using an example in which the sectorial area panel is on the left side of the accessory switching control. A first virtual environment interface 81 includes an accessory switching control 82. When a trigger operation on the accessory switching control 82 is received, a sectorial area panel 83 is displayed. The sectorial area panel includes seven candidate boxes, and three gun accessories are displayed in a candidate box 831, a candidate box 832, and a candidate box 833 (one gun accessory is displayed in each candidate box).

The foregoing description is provided by using an example in which the candidate accessory zone is a sectorial area panel. In actual operation, the candidate accessory zone may alternatively be a rectangular area panel, a circular area panel, a hexagonal area panel, or the like. This is not limited in this embodiment of this application.

Optionally, the gun accessories may be displayed in the candidate accessory zone in any one of the following manners:

1. The candidate accessory zone sequentially displays the n gun accessories according to how often the virtual object uses the gun accessories.

Optionally, when a sectorial area panel is displayed in the candidate accessory zone, the sectorial area panel includes at least one layer of sectorial sub-area, and p gun accessories used most frequently are displayed in the first layer of sectorial sub-area, the first layer of sectorial sub-area being a sectorial sub-area closest to the accessory switching control, and p≤n.

2. The candidate accessory zone sequentially displays the n gun accessories according to fitting degrees between the virtual gun and the gun accessories.

Optionally, when a sectorial area panel is displayed in the candidate accessory zone, the sectorial area panel includes at least one layer of sectorial sub-area, and p gun accessories with the highest degree of adaptation are displayed in the first layer of sectorial sub-area.

3. The candidate accessory zone displays the n gun accessories according to a preset display order.

Optionally, when a sectorial area panel is displayed in the candidate accessory zone, the sectorial area panel includes at least one layer of sectorial sub-area, and the first p gun accessories corresponding to the preset display order are displayed in the first layer of sectorial sub-area.

Optionally, the preset display order may be a display order provided in the application program, or may be a display order obtained after a player presets priorities of the gun accessories.

4. The candidate accessory zone sequentially displays the n gun accessories according to an order of picking up the gun accessories by the virtual object.

In the foregoing manners, when the n gun accessories are sequentially displayed in the first layer of sectorial sub-area, the n gun accessories may be sequentially displayed from top to bottom in the first layer of sectorial sub-area, or the n gun accessories may be sequentially displayed from bottom to top in the first layer of sectorial sub-area. Alternatively, the n gun accessories may be sequentially displayed from a middle position to two sides in the first layer of sectorial sub-area. Schematically, descriptions are provided by using an example in which five gun accessories are sequentially displayed from a middle position to two sides in the first layer of sectorial sub-area. The five gun accessories sequentially arranged are respectively an accessory a, an accessory b, an accessory c, an accessory d, and an accessory e. Five candidate boxes from top to bottom in the first layer of sectorial sub-area are respectively a candidate box A, a candidate box B, a candidate box C, a candidate box D, and a candidate box E. Then, the accessory a is displayed in the candidate box C, the accessory b is displayed in the candidate box B, the accessory c is displayed in the candidate box D, the accessory d is displayed in the candidate box A, and the accessory e is displayed in the candidate box E.

Step 504: Receive a selection operation on a target gun accessory in n gun accessories.

Optionally, a manner of receiving a selection operation on a target gun accessory includes either of the following manners:

1. receiving a click/tap operation on the target gun accessory; and
2. receiving, in a case that the trigger operation is a press operation, a drag operation following the press operation, a start position of the drag operation being a first display position corresponding to the accessory switching control, and an end position of the drag operation being a second display position corresponding to the target gun accessory; and receiving a drag end operation at the second display position, and determining the drag end operation as the selection operation on the target gun accessory.

Optionally, each gun accessory corresponds to one accessory identifier, and the target gun accessory is fitted on the virtual gun according to a target accessory identifier of the target gun accessory corresponding to the selection operation.

Step 505: Replace the first virtual environment interface with a second virtual environment interface according to the selection operation.

Optionally, the second virtual environment interface includes a picture of the virtual environment observed by the virtual object, the virtual object holds the virtual gun, and the target gun accessory is fitted in the target slot of the virtual gun.

Figure 9:
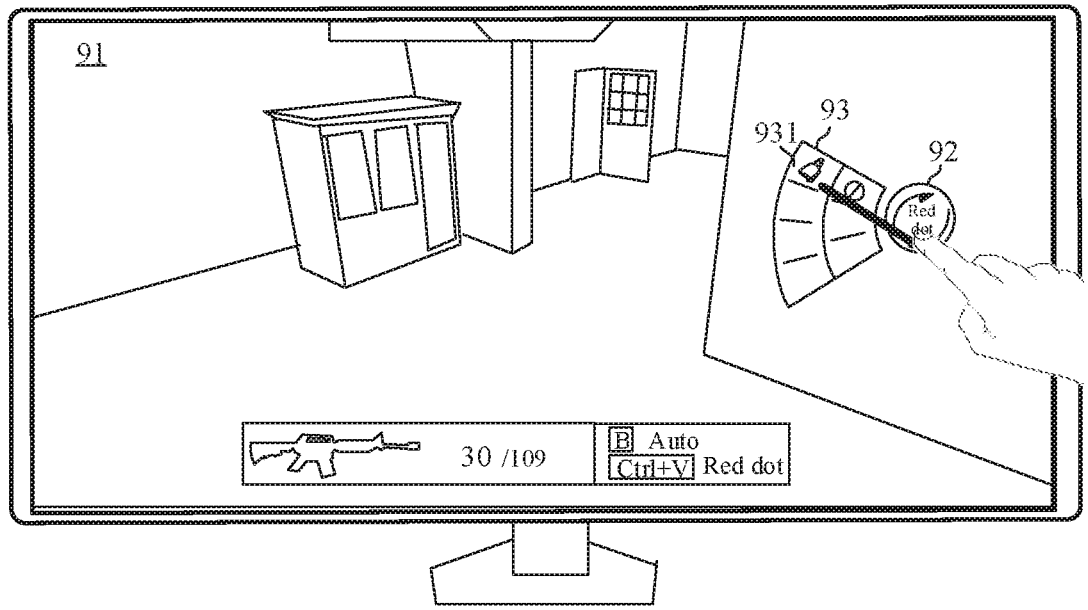
FIG. 9 is a schematic diagram of a terminal interface according to another exemplary embodiment of this application.

Schematically, referring to FIG. 9, a first virtual environment interface 91 includes an accessory switching control 92. When a press operation on the accessory switching control 92 is received (for example, the user presses the accessory switching control 92 on the screen by using a finger), a sectorial area panel 93 is displayed. The sectorial area panel includes seven candidate boxes. A gun accessory is displayed in a candidate box 931. A drag operation following the press operation is received, a start position of the drag operation being a first display position corresponding to the accessory switching control 92, and an end position of the drag operation being a second display position corresponding to the candidate box 931. When a press end operation on the candidate box 931 is received (for example, the user lifts the finger from the screen), the press end operation is determined as a selection operation on a target gun accessory in the candidate box 931, and the gun accessory displayed in the candidate box 931 is fitted on the virtual gun.

Briefly, the user moves the finger from the position of the accessory switching control 92 to the position of the candidate box 931 in the first virtual environment interface 91 and releases the pressing of the finger on the screen, to fit the gun accessory displayed in the candidate box 931.

In conclusion, in the method for selecting an accessory in a virtual environment provided in this embodiment of this application, the accessory switching control is displayed in the first virtual environment interface. When the trigger operation on the accessory switching control is received, the candidate accessory zone is displayed in the peripheral region of the accessory switching control, and the n gun accessories of the same accessory type are displayed in the candidate accessory zone. In this way, a user may select any one of the n gun accessories to be fitted in the target slot without opening a backpack to select a to-be-selected accessory. Operation steps in the entire switching process are simple, and the human-computer interaction efficiency is relatively high when the user switches between accessories.

In the method provided in this embodiment, when the trigger operation is a press operation and the selection operation is a drag operation, the action performed when the user selects the target gun accessory may be considered as a drag operation from the position corresponding to the accessory switching control to the position corresponding to the target gun accessory, that is, the user selects the target gun accessory through a drag operation during operation. The selection process is more convenient and easier to operate.

In the method provided in this embodiment, the gun accessories are displayed through the sectorial area panel, and the gun accessory used frequently is displayed in the inner layer closest to the accessory switching control, facilitating switching to the gun accessory used frequently. When the terminal displays the first virtual environment interface in a landscape mode, the gun accessory used frequently is displayed in the inner layer closest to the accessory switching control where the finger is located, so that the finger can easily select the gun accessory used frequently.

In the method provided in this embodiment, the gun accessories are displayed through the sectorial area panel, and the gun accessory with a high degree of adaptation is displayed in the inner layer closest to the accessory switching control, facilitating switching to the gun accessory with a high degree of adaptation. When the terminal displays the first virtual environment interface in a landscape mode, the gun accessory with a high degree of adaptation is displayed in the inner layer closest to the accessory switching control where the finger is located, so that the finger can easily select the gun accessory with a high degree of adaptation.

Figure 10:
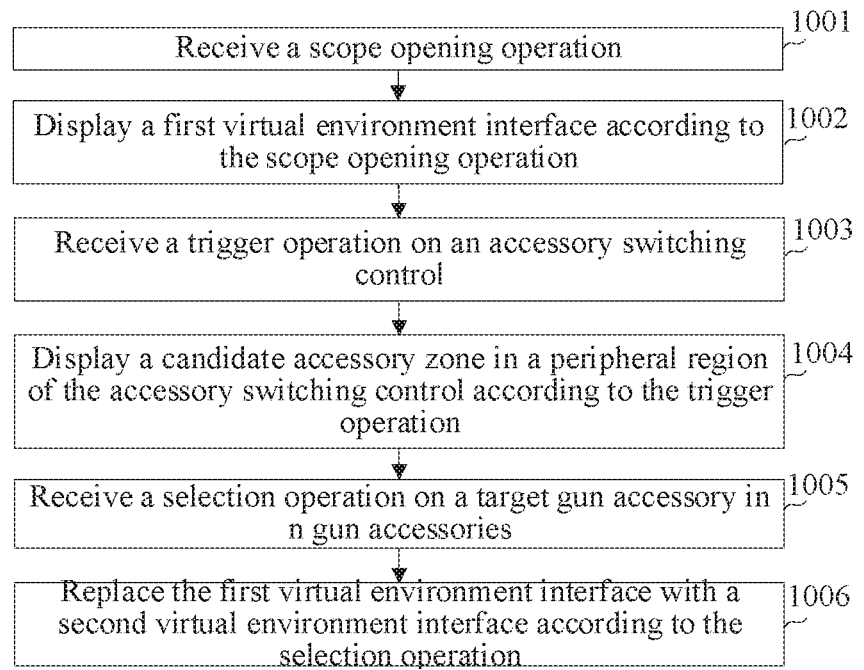
FIG. 10 is a flowchart of a method for selecting an accessory in a virtual environment according to another exemplary embodiment of this application.

In an optional embodiment, the target slot is a slot for fitting a scope, and a first scope is fitted on the virtual gun in a process of displaying the first virtual environment interface. Referring to FIG. 10, FIG. 10 is a flowchart of a method for selecting an accessory in a virtual environment according to another exemplary embodiment of this application. This embodiment is described by using an example in which the method is applied to a terminal. The method for selecting an accessory in a virtual environment includes the following steps:

Step 1001: Receive a scope opening operation.

Optionally, the scope opening operation is used for observing the virtual environment by using a first scope in a target slot.

Step 1002: Display a first virtual environment interface according to the scope opening operation.

Optionally, the first virtual environment interface includes the virtual environment displayed magnified at a magnification of the first scope by a virtual object.

Optionally, the first virtual environment interface includes a picture of the virtual environment displayed magnified at the magnification of the first scope and observed by the virtual object, an accessory switching control is displayed superimposed on the picture, the virtual object holds a virtual gun in the virtual environment, and the first scope is fitted on the virtual gun.

Step 1003: Receive a trigger operation on an accessory switching control.

Step 1004: Display a candidate accessory zone in a local peripheral region of the accessory switching control according to the trigger operation.

Optionally, n gun accessories of the same accessory type are displayed in the candidate accessory zone, and the gun accessory is an accessory that has been obtained by the virtual object and that is used for being fitted in a slot corresponding to the accessory type on the virtual gun, n being a positive integer.

Optionally, when the candidate accessory zone is displayed in the local peripheral region of the accessory switching control according to the trigger operation, a rectangular area panel may be displayed in the peripheral region of the accessory switching control according to the trigger operation, and the n gun accessories are displayed in the rectangular area panel.

Figure 11:
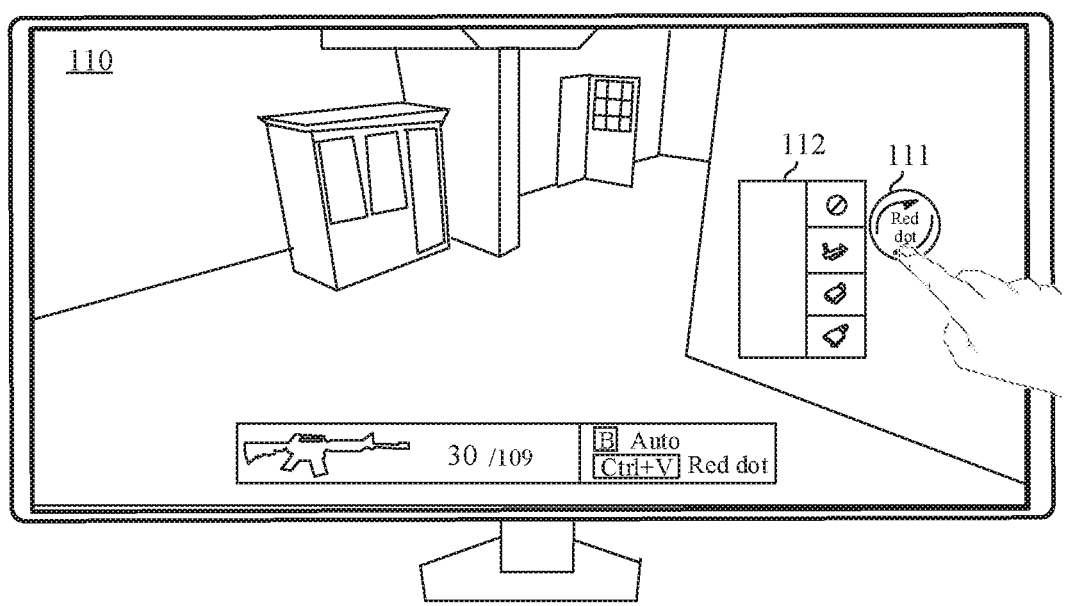
FIG. 11 is a schematic diagram of a terminal interface according to another exemplary embodiment of this application.

Schematically, as shown in FIG. 11, an accessory switching control 111 is displayed in a first virtual environment interface 110. When a trigger operation on the accessory switching control 111 is received, a rectangular area panel 112 is displayed, and three gun accessories are displayed in the rectangular area panel 112.

Step 1005: Receive a selection operation on a target gun accessory in n gun accessories.

Optionally, when the trigger operation is a press operation, a drag operation following the press operation is received, a start position of the drag operation being a first display position corresponding to the accessory switching control, an end position of the drag operation being a second display position corresponding to the target gun accessory; and a drag end operation at the second display position is received, and the drag end operation is determined as the selection operation on the target gun accessory.

Step 1006: Replace the first virtual environment interface with a second virtual environment interface according to the selection operation.

Optionally, the second virtual environment interface includes the virtual environment displayed at a magnification of a second scope.

Figure 12:
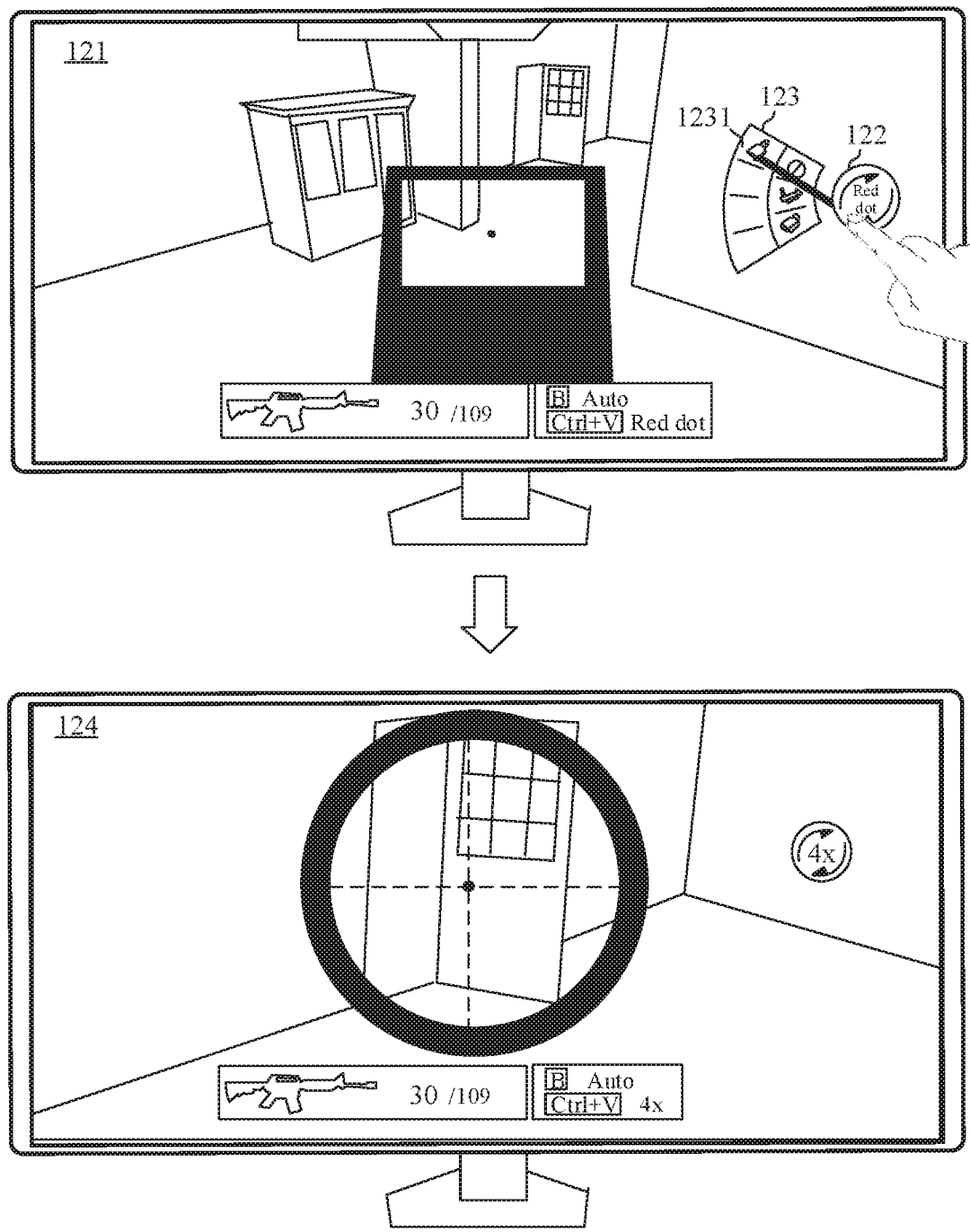
FIG. 12 is a schematic diagram of a terminal interface according to another exemplary embodiment of this application.

Schematically, referring to FIG. 12, a first virtual environment interface 121 includes a picture of the virtual environment observed by using a red dot scope. An accessory switching control 122 is displayed in the first virtual environment interface 121. When a press operation on the accessory switching control 122 is received, a sectorial area panel 123 is displayed. A drag operation following the press operation is received, an end position of the drag operation being a position corresponding to a candidate box 1231, and a press end operation is received. A 4× scope in the candidate box 1231 is used as a switched-to scope. A second virtual environment interface 124 is displayed. The second virtual environment interface 124 includes a picture of the virtual environment observed by using the 4× scope.

In conclusion, in the method provided in this embodiment, when the virtual environment is observed by using a scope, a scope that has been picked up may be directly selected, and a virtual environment interface corresponding to the selected scope may be directly switched to. The steps to use the scope are simple, and the human-computer interaction efficiency is relatively high.

Figure 13:
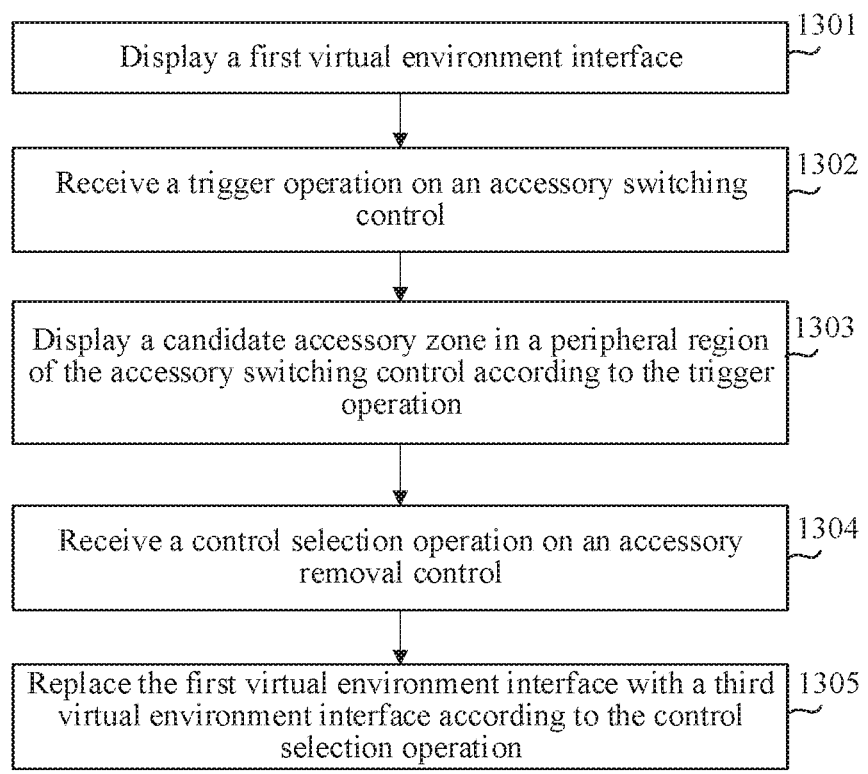
FIG. 13 is a flowchart of a method for selecting an accessory in a virtual environment according to another exemplary embodiment of this application.

In an optional embodiment, the candidate accessory zone further includes an accessory removal control configured to remove the gun accessory in the target slot of the virtual gun. Referring to FIG. 13, FIG. 13 is a flowchart of a method for selecting an accessory in a virtual environment according to another exemplary embodiment of this application. This embodiment is described by using an example in which the method is applied to a terminal. The method for selecting an accessory in a virtual environment includes the following steps:

Step 1301: Display a first virtual environment interface.

Optionally, the first virtual environment interface includes a picture of the virtual environment observed by a virtual object, an accessory switching control is displayed superimposed on the picture, and the virtual object holds a virtual gun in the virtual environment.

Optionally, the first virtual environment interface may alternatively be a picture of the virtual environment observed by using a scope on the virtual gun. For example, a target slot of the virtual gun is used for fitting a scope. A first scope is fitted on the virtual gun. Then, a scope opening operation is received. The scope opening operation is used for observing the virtual environment by using the first scope in the target slot. The first virtual environment interface is displayed according to the first scope. The first virtual environment interface includes the virtual environment displayed magnified at a magnification of the first scope.

Step 1302: Receive a trigger operation on an accessory switching control.

Optionally, a manner of receiving a trigger operation includes either of the following manners:
1. receiving a click/tap operation on the accessory switching control; and
2. receiving a press operation on the accessory switching control.

Step 1303: Display a candidate accessory zone in a local peripheral region of the accessory switching control according to the trigger operation.

Optionally, the candidate accessory zone includes an accessory removal control.

Optionally, n gun accessories of the same accessory type are displayed in the candidate accessory zone, and the gun accessory is an accessory that has been obtained by the virtual object and that is used for being fitted in a slot corresponding to the accessory type on the virtual gun, n being a positive integer.

Step 1304: Receive a control selection operation on an accessory removal control.

Optionally, a manner of receiving a control selection operation on an accessory removal control includes either of the following manners:
1. receiving a click/tap operation on the accessory removal control; and
2. receiving, in a case that the trigger operation is a press operation, a drag operation following the press operation, a start position of the drag operation being a first display position corresponding to the accessory switching control, and an end position of the drag operation being a third display position corresponding to the accessory removal control; and receiving a press end operation at the third display position, and determining the press end operation as the control selection operation on the accessory removal control.

Schematically, when a press operation on the accessory switching control is received (for example, a user presses the accessory switching control on a screen by using a finger), a candidate accessory zone is displayed. The candidate accessory zone further includes an accessory removal control. A drag operation following the press operation is received, a start position of the drag operation being a first display position corresponding to the accessory switching control, and an end position of the drag operation being a third display position corresponding to the accessory removal control (that is, the user moves the finger from the position corresponding to the accessory switching control to the position corresponding to the accessory removal control). When a press end operation on the accessory removal control is received (for example, the user lifts the finger from the screen), the press end operation is determined as a control selection operation on the accessory removal control, and a gun accessory on the virtual gun is removed.

Step 1305: Replace the first virtual environment interface with a third virtual environment interface according to the control selection operation.

Optionally, the third virtual environment interface includes a picture of the virtual environment observed by the virtual object, the virtual object holds the virtual gun, and no gun accessory is fitted in a target slot of the virtual gun.

Optionally, when the first virtual environment interface includes a picture of the virtual environment observed by using a scope, the third virtual environment interface includes a picture of the virtual environment observed by using a mechanical scope corresponding to the virtual gun.

In conclusion, in the method provided in this embodiment, the accessory removal control is further displayed in the candidate accessory zone and the accessory removal control is selected, the gun accessory on the virtual gun may be directly removed without opening a backpack to remove the gun accessory. Operation steps in the entire removal process are simple, and the human-computer interaction efficiency is relatively high when the user removes the gun accessory.

In the foregoing method, the accessory removal control and/or the target gun accessory may be selected in two manners: a click/tap operation or a drag operation. Selection of the accessory removal control and/or the target gun accessory in the two manners is used for schematic descriptions.

Figure 14:
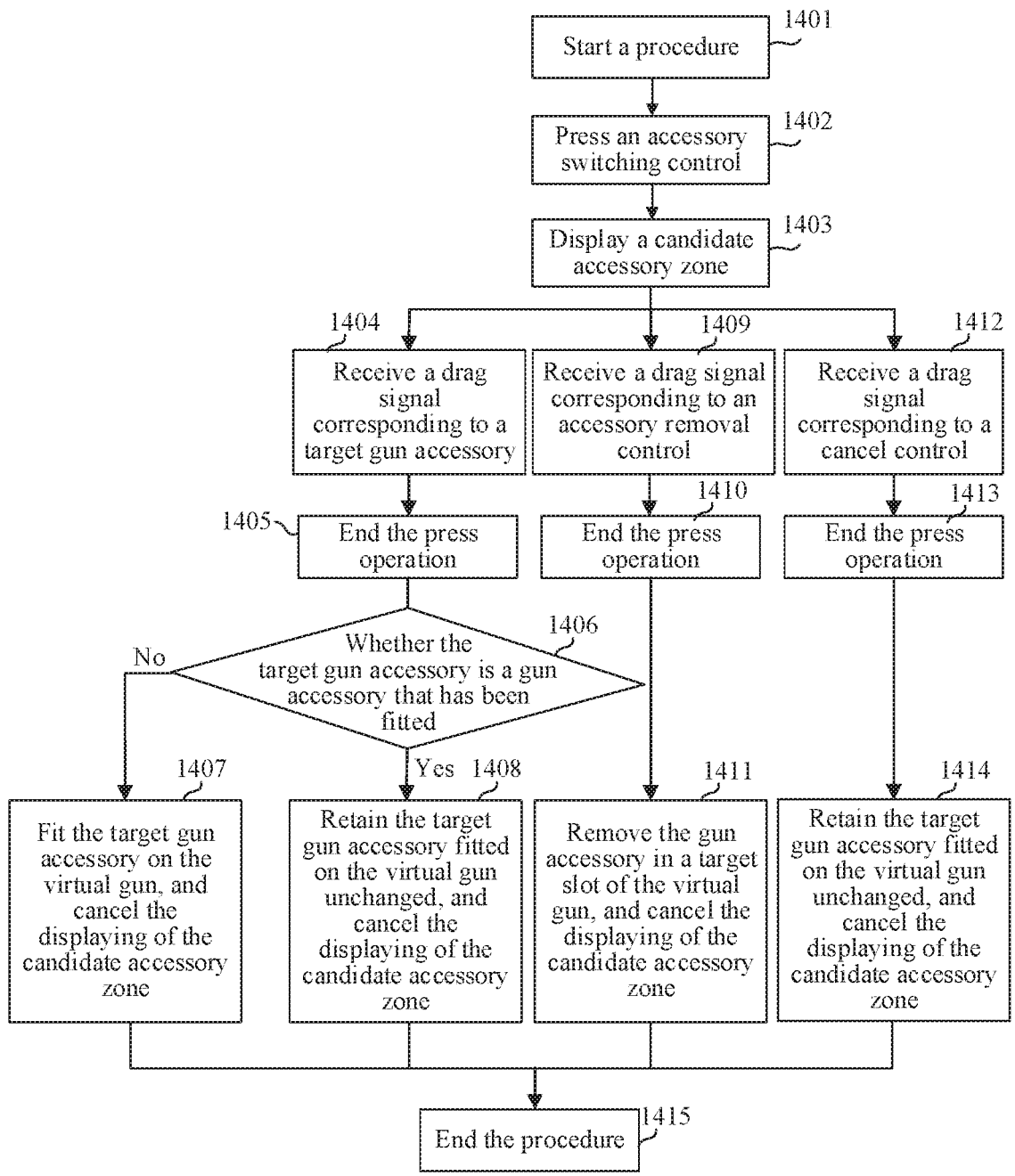
FIG. 14 is a flowchart of a method for selecting an accessory in a virtual environment according to another exemplary embodiment of this application.
Figure 15:
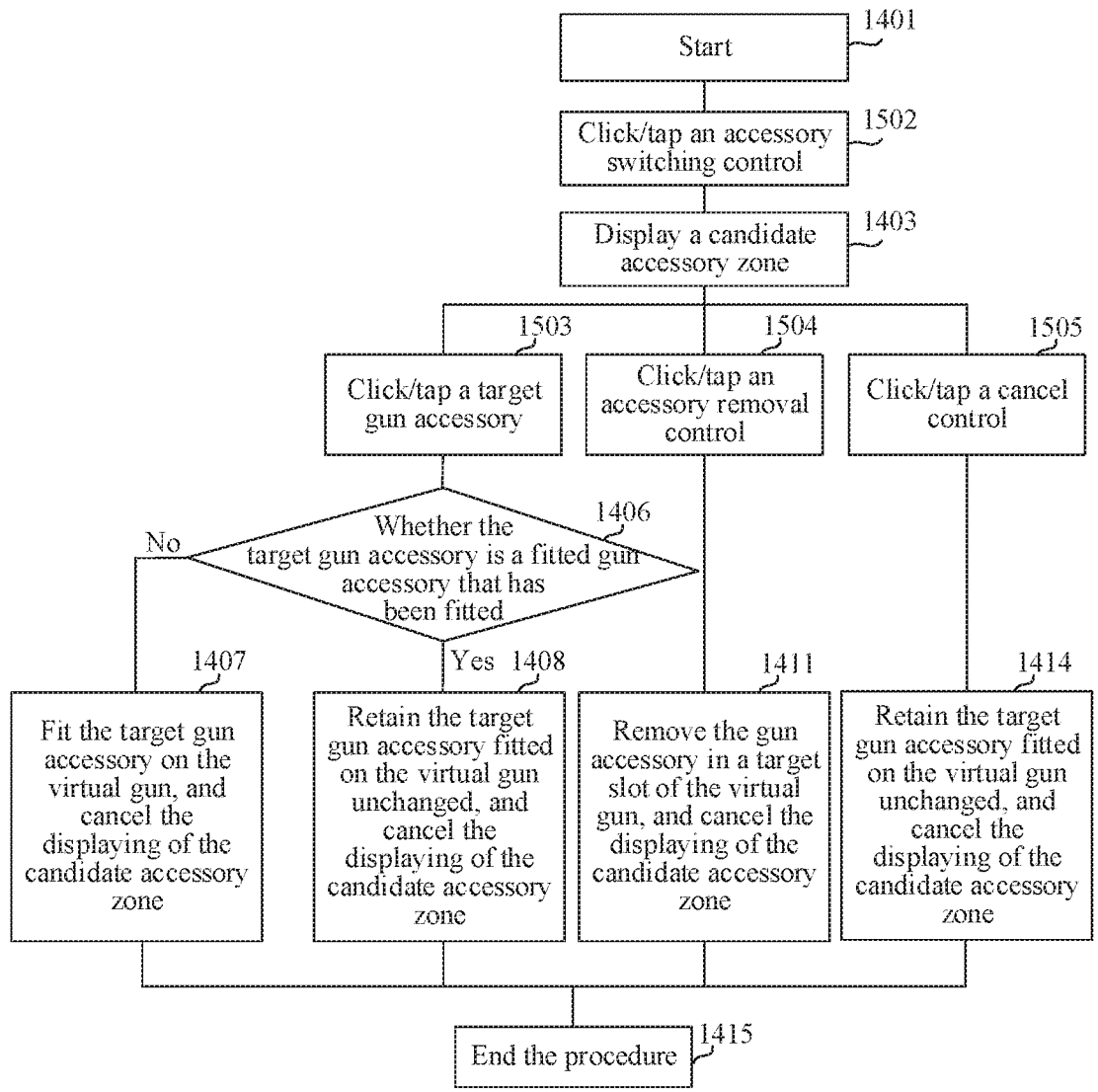
FIG. 15 is a flowchart of a method for selecting an accessory in a virtual environment according to another exemplary embodiment of this application.

Optionally, the first virtual environment interface further includes a cancel control. Referring to FIG. 14 and FIG. 15, FIG. 14 is a flowchart of a method for selecting an accessory removal control and/or a target gun accessory through a drag operation. As shown in FIG. 14, the method includes the following steps:

Step 1401: Start a procedure.

Step 1402: Press an accessory switching control.

Step 1403: Display a candidate accessory zone.

Optionally, n gun accessories of the same accessory type are displayed in the candidate accessory zone. The gun accessory is an accessory that has been obtained by the virtual object and that is used for being fitted in a slot corresponding to the accessory type on a virtual gun, and n is a positive integer.

Optionally, when the candidate accessory zone is displayed in a local peripheral region of the accessory switching control according to a trigger operation, either of the following cases is included:

1. A sectorial area panel is displayed in the local peripheral region according to the trigger operation by using the accessory switching control as a center, the sectorial area panel including m candidate boxes, and the n gun accessories are displayed in n of the m candidate boxes, m≥n.
2. A rectangular area panel is displayed in the peripheral region of the accessory switching control according to the trigger operation, and the n gun accessories are displayed in the rectangular area panel.

Optionally, the candidate accessory zone further includes an accessory removal control.

The candidate accessory zone is described by using the sectorial area panel and the rectangular area panel as examples. In actual operation, the candidate accessory zone may alternatively be a circular area panel, a hexagonal area panel, or the like. This is not limited in this embodiment of this application.

Step 1404: Receive a drag signal corresponding to a target gun accessory.

That is, the drag signal is a signal triggered by a drag operation that ends on the target gun accessory.

Step 1405: End the press operation.

That is, the target gun accessory is selected.

Step 1406: Determine whether the target gun accessory is a gun accessory that has been fitted.

Step 1407: Fit the target gun accessory on the virtual gun in a case that the target gun accessory is not the gun accessory that has been fitted, and cancel the displaying of the candidate accessory zone.

Step 1408: Retain the target gun accessory fitted on the virtual gun unchanged in a case that the target gun accessory is the gun accessory that has been fitted, and cancel the displaying of the candidate accessory zone.

Step 1409: Receive a drag signal corresponding to an accessory removal control.

That is, the drag signal is a signal triggered by a drag operation that ends on the accessory removal control.

Step 1410: End the press operation.

Step 1411: Remove a gun accessory in a target slot of the virtual gun, and cancel the displaying of the candidate accessory zone.

Step 1412: Receive a drag signal corresponding to a cancel control.

That is, the drag signal is a signal triggered by a drag operation that ends on the cancel control.

Step 1413: End the press operation.

Step 1414: Retain the target gun accessory fitted on the virtual gun unchanged, and cancel the displaying of the candidate accessory zone.

Step 1415: End the procedure.

FIG. 15 is a flowchart of a method for selecting an accessory removal control and/or a target gun accessory through a click/tap operation. As shown in FIG. 15, in the foregoing method flowchart shown in FIG. 14, step 1502 may be implemented in place of step 1402, step 1503 may be implemented in place of step 1404 and step 1405, step 1504 may be implemented in place of step 1409 and step 1410, and step 1505 may be implemented in place of step 1412 and step 1413.

Step 1502: Click/tap an accessory switching control.
Step 1503: Click/tap a target gun accessory.
Step 1504: Click/tap an accessory removal control.
Step 1505: Click/tap a cancel control.

In conclusion, in the method for selecting an accessory in a virtual environment provided in this embodiment of this application, the accessory switching control is displayed superimposed on the picture. When the trigger operation on the accessory switching control is received, the candidate accessory zone is displayed in the peripheral region of the accessory switching control, and the n gun accessories of the same accessory type are displayed in the candidate accessory zone. In this way, a user may select any one of the n gun accessories to be fitted in the target slot without opening a backpack to select a to-be-selected accessory. The steps are simple, and the human-computer interaction efficiency is relatively high when the user switches between accessories.

Figure 16:
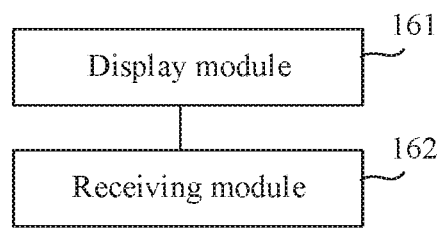
FIG. 16 is a structural block diagram of an apparatus for selecting an accessory in a virtual environment according to an exemplary embodiment of this application.

FIG. 16 is a structural block diagram of an apparatus for selecting an accessory in a virtual environment according to an exemplary embodiment of this application. Descriptions are provided by using an example in which the apparatus is applied to a terminal. As shown in FIG. 16, the apparatus includes a display module 161 and a receiving module 162.

The display module 161 is configured to display a first virtual environment interface, the first virtual environment interface including a picture of the virtual environment observed by a virtual object, an accessory switching control being displayed superimposed on the picture, and the virtual object holding a virtual gun in the virtual environment.

The receiving module 162 is configured to receive a trigger operation on the accessory switching control.

The display module 161 is further configured to display a candidate accessory zone in a local peripheral region of the accessory switching control according to the trigger operation, n gun accessories of the same accessory type being displayed in the candidate accessory zone, the gun accessory being an accessory that has been obtained by the virtual object and that is used for being fitted on the virtual gun, the gun accessory being fitted in a slot corresponding to the accessory type on the virtual gun, and n being a positive integer.

The receiving module 162 is further configured to receive a selection operation on a target gun accessory in the n gun accessories.

The display module 161 is further configured to display a second virtual environment interface according to the selection operation, the second virtual environment interface including a picture of the virtual environment observed by the virtual object, the virtual object holding the virtual gun, and the target gun accessory being fitted in a target slot of the virtual gun.

In an optional embodiment, the display module 161 is further configured to display, according to the trigger operation, a sectorial area panel in the local peripheral region with the accessory switching control as a center, the sectorial area panel including m candidate boxes, the n gun accessories being displayed in n of the m candidate boxes, and m≥n.

In an optional embodiment, the receiving module 162 is further configured to receive a press operation on the accessory switching control.

The receiving module 162 is further configured to receive a drag operation following the press operation, a start position of the drag operation being a first display position corresponding to the accessory switching control, and an end position of the drag operation being a second display position corresponding to the target gun accessory; and receive a drag end operation at the second display position, and determine the drag end operation as the selection operation on the target gun accessory.

In an optional embodiment, the candidate accessory zone is used for sequentially displaying the n gun accessories according to how often the virtual object uses the gun accessories;

or, the candidate accessory zone is used for sequentially displaying the n gun accessories according to fitting degrees between the virtual gun and the gun accessories;

or, the candidate accessory zone is used for displaying the n gun accessories according to a preset display order;

or, the candidate accessory zone is used for sequentially displaying the n gun accessories according to an order of picking up the gun accessories by the virtual object.

Figure 17:
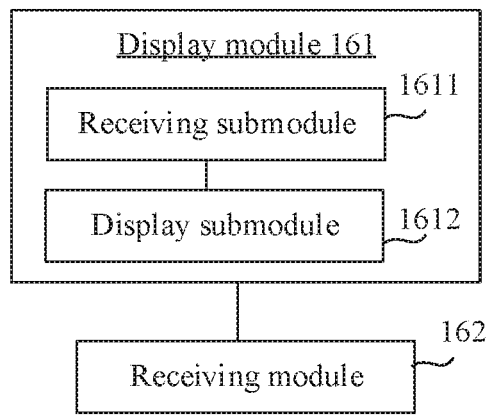
FIG. 17 is a structural block diagram of an apparatus for selecting an accessory in a virtual environment according to another exemplary embodiment of this application.

In an optional embodiment, as shown in FIG. 17, the display module 161 further includes a receiving submodule 1611 and a display submodule 1612.

The target slot is a slot for fitting a scope, a first scope is fitted in the target slot of the virtual gun in a process of displaying the first virtual environment interface, and the target gun accessory is a second scope.

The receiving submodule 1611 is configured to receive a scope opening operation, the scope opening operation being used for observing the virtual environment by using the first scope in the target slot.

The display submodule 1612 is configured to display the first virtual environment interface according to the scope opening operation, the first virtual environment interface including the virtual environment displayed magnified at a magnification of the first scope.

The display module 161 is further configured to display the second virtual environment interface according to the selection operation, the second virtual environment interface including the virtual environment displayed magnified at a magnification of the second scope.

In an optional embodiment, the candidate accessory zone further includes an accessory removal control configured to remove the gun accessory in the target slot.

The receiving module 162 is further configured to receive a control selection operation on the accessory removal control.

The display module 161 is further configured to display a third virtual environment interface according to the control selection operation, the third virtual environment interface including a picture of the virtual environment observed by the virtual object, the virtual object holding the virtual gun, and no gun accessory being fitted in the target slot of the virtual gun.

In an optional embodiment, the target slot is a slot for fitting a scope, and a first scope is fitted in the target slot of the virtual gun in a process of displaying the first virtual environment interface.

The receiving submodule 1611 is further configured to receive a scope opening operation, the scope opening operation being used for observing the virtual environment by using the first scope in the target slot.

The display submodule 1612 is further configured to display the first virtual environment interface according to the scope opening operation, the first virtual environment interface including the virtual environment displayed magnified at a magnification of the first scope.

The display module 161 is further configured to display the third virtual environment interface according to the control selection operation, the third virtual environment interface including a picture of the virtual environment observed by using a mechanical scope corresponding to the virtual gun.

Figure 18:
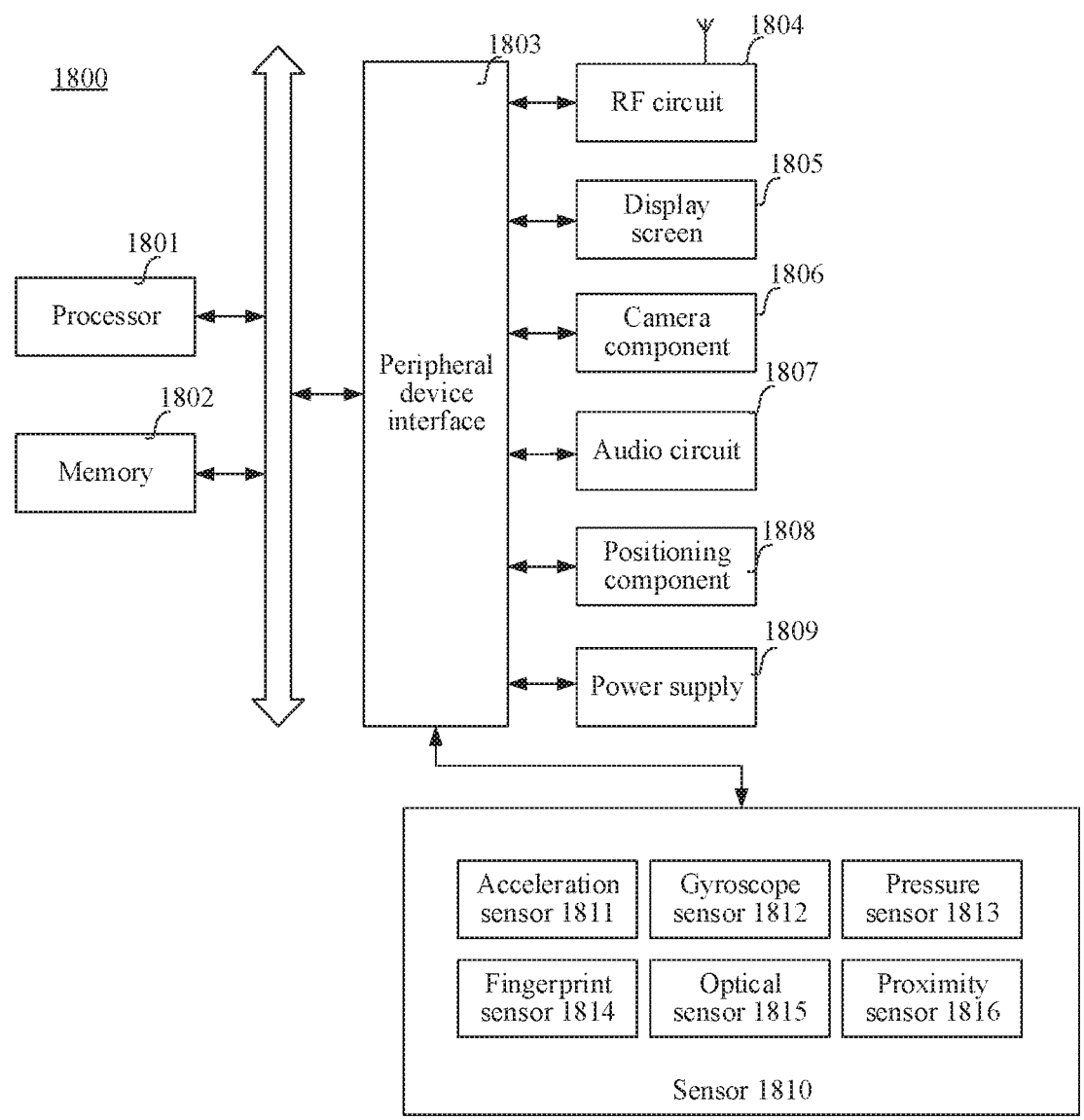
FIG. 18 is a structural block diagram of a terminal according to an exemplary embodiment of this application.

FIG. 18 is a structural block diagram of a terminal 1800 according to an exemplary embodiment of the present disclosure. The terminal 1800 may be a smartphone, a tablet computer, an MP3 player, an MP4 player, a notebook computer, or a desktop computer. The terminal 1800 may also be referred to as another name such as user equipment, a portable terminal, a laptop terminal, a desktop terminal, or the like.

Generally, the terminal 1800 includes a processor 1801 and a memory 1802.

The processor 1801 may include one or more processing cores, for example, a 4-core processor, or an 8-core processor. The processor 1801 may be implemented in at least one hardware form of a digital signal processor (DSP), a field-programmable gate array (FPGA), and a programmable logic array (PLA). The processor 1801 may also include a main processor and a coprocessor. The main processor is a processor configured to process data in an active state, and is also referred to as a central processing unit (CPU). The coprocessor is a low-power processor configured to process data in a standby state. In some embodiments, the processor 1801 may be integrated with a graphics processing unit (GPU). The GPU is configured to be responsible for rendering and drawing content that a display screen needs to display. In some embodiments, the processor 1801 may further include an artificial intelligence (AI) processor. The AI processor is configured to process a computing operation related to machine learning.

The memory 1802 may include one or more computer-readable storage media. The computer-readable storage medium may be non-transient. The memory 1802 may further include a high-speed random access memory (RAM) and a non-volatile memory, for example, one or more magnetic disk storage devices or flash memory devices. In some embodiments, the non-transitory computer-readable storage medium in the memory 1802 is configured to store at least one instruction, and the at least one instruction is used for being executed by the processor 1801 to implement the method for selecting an accessory in a virtual environment provided in the method embodiments of this application.

In some embodiments, the terminal 1800 further may optionally include a peripheral device interface 1803 and at least one peripheral device. The processor 1801, the memory 1802, and the peripheral device interface 1803 may be connected by using a bus or a signal cable. Each peripheral device may be connected to the peripheral device interface 1803 by using a bus, a signal cable, or a circuit board. Specifically, the peripheral device includes at least one of a radio frequency (RF) circuit 1804, a display screen 1805, a camera component 1806, an audio circuit 1807, a positioning component 1808, and a power supply 1809.

The peripheral device interface 1803 may be configured to connect the at least one peripheral device related to input/output (I/O) to the processor 1801 and the memory 1802. In some embodiments, the processor 1801, the memory 1802, and the peripheral device interface 1803 are integrated on the same chip or circuit board. In some other embodiments, any one or two of the processor 1801, the memory 1802, and the peripheral device interface 1803 may be implemented on a single chip or circuit board. This is not limited in this embodiment.

The RF circuit 1804 is configured to receive and transmit an RF signal, which is also referred to as an electromagnetic signal. The RF circuit 1804 communicates with a communication network and other communication devices by using the electromagnetic signal. The RF circuit 1804 converts an electrical signal into an electromagnetic signal to be transmitted, or converts a received electromagnetic signal into an electrical signal. Optionally, the RF circuit 1804 includes: an antenna system, an RF transceiver, one or more amplifiers, a tuner, an oscillator, a DSP, a codec chipset, a subscriber identity module card, and the like. The RF circuit 1804 may communicate with other terminals through at least one wireless communication protocol. The wireless communication protocol includes, but is not limited to: World Wide Web, a metropolitan area network, an intranet, (2G, 3G, 4G, and 5G) mobile communication networks, a wireless local area network, and/or a wireless fidelity (Wi-Fi) network. In some embodiments, the RF circuit 1804 may also include a circuit related to near field communication (NFC). This is not limited in this application.

The display screen 1805 is configured to display a UI. The UI may include a graphic, a text, an icon, a video, and any combination thereof. When the display screen 1805 is a touchscreen, the display screen 1805 also has a capability of collecting a touch signal on or above a surface of the display screen 1805. The touch signal may be input, as a control signal, to the processor 1801 for processing. In this case, the display screen 1805 may be further configured to provide a virtual button and/or a virtual keyboard, which is also referred to as a soft button and/or a soft keyboard. In some embodiments, there may be one display screen 1805, disposed on a front panel of the terminal 1800. In some other embodiments, there may be at least two display screens 1805, disposed on different surfaces of the terminal 1800 respectively or in a folded design. In some more embodiments, the display screen 1805 may be a flexible display screen, disposed on a curved surface or a folded surface of the terminal 1800. Even, the display screen 1805 may be further set in a non-rectangular irregular pattern, namely, a special-shaped screen. The display screen 1805 may be made of a material such as a liquid crystal display (LCD) or an organic light-emitting diode (OLED).

The camera component 1806 is configured to collect an image or a video. Optionally, the camera component 1806 includes a front-facing camera and a rear-facing camera. Generally, the front-facing camera is disposed on the front panel of the terminal, and the rear-facing camera is disposed on a back surface of the terminal. In some embodiments, there are at least two rear-facing cameras, each of which is any one of a main camera, a depth of field camera, a wide-angle camera, and a long-focus camera, so as to implement a background blurring function by fusing the main camera and the depth of field camera, and panoramic photographing and VR photographing functions or another fusion photographing function by fusing the main camera and the wide-angle camera. In some embodiments, the camera component 1806 may further include a flash. The flash may be a monochrome temperature flash, or may be a double color temperature flash. The double color temperature flash refers to a combination of a warm light flash and a cold light flash, and may be used for light compensation under different color temperatures.

The audio circuit 1807 may include a microphone and a speaker. The microphone is configured to collect a sound wave of a user and an environment, and convert the sound wave into the electrical signal to be input to the processor 1801 for processing, or to be input to the RF circuit 1804 for implementing voice communication. For the purpose of stereo collection or noise reduction, there may be a plurality of microphones, disposed at different portions of the terminal 1800 respectively. The microphone may be further an array microphone or an omni-directional collection type microphone. The speaker is configured to convert an electrical signal from the processor 1801 or the RF circuit 1804 into a sound wave. The speaker may be a conventional film speaker, or may be a piezoelectric ceramic speaker. When the speaker is the piezoelectric ceramic speaker, not only the electrical signal can be converted into a sound wave audible to a human being, but also the electrical signal can be converted into a sound wave inaudible to the human being for ranging and the like. In some embodiments, the audio circuit 1807 may alternatively include an earphone jack.

The positioning component 1808 is configured to position a current geographic location of the terminal 1800 for implementing navigation or a location based service (LBS). The positioning component 1808 may be a positioning component based on the global positioning system (GPS) of the United States, the Beidou system of China, or the Galileo system of Russia.

The power supply 1809 is configured to supply power for various components in the terminal 1800. The power supply 1809 may be an alternating current, a direct current, a disposable battery, or a rechargeable battery. When the power supply 1809 includes the rechargeable battery, the rechargeable battery may be a wired rechargeable battery or a wireless rechargeable battery. The wired rechargeable battery is a battery charged through a wired line. The wireless rechargeable battery is a battery charged through a wireless coil. The rechargeable battery may be further configured to support a fast charge technology.

In some embodiments, the terminal 1800 further includes one or more sensors 1810. The one or more sensors 1810 include, but are not limited to, an acceleration sensor 1811, a gyroscope sensor 1812, a pressure sensor 1813, a fingerprint sensor 1814, an optical sensor 1815, and a proximity sensor 1816.

The acceleration sensor 1811 may detect the magnitude of acceleration on three coordinate axes of a coordinate system established based on the terminal 1800. For example, the acceleration sensor 1811 may be configured to detect components of gravity acceleration on the three coordinate axes. The processor 1801 may control, according to a gravity acceleration signal collected by the acceleration sensor 1811, the display screen 1805 to display the UI in a transverse view or a longitudinal view. The acceleration sensor 1811 may be further configured to collect motion data of a game or a user.

The gyroscope sensor 1812 may detect a body direction and a rotation angle of the terminal 1800. The gyroscope sensor 1812 may cooperate with the acceleration sensor 1811 to collect a 3D action by the user on the terminal 1800. The processor 1801 may implement the following functions according to the data collected by the gyroscope sensor 1812: motion sensing (such as changing the UI according to a tilt operation of the user), image stabilization during photographing, game control, and inertial navigation.

The pressure sensor 1813 may be disposed at a side frame of the terminal 1800 and/or a lower layer of the display screen 1805. When the pressure sensor 1813 is disposed at the side frame of the terminal 1800, a holding signal of the user on the terminal 1800 may be detected, and the processor 1801 performs left/right hand identification or a quick operation according to the holding signal collected by the pressure sensor 1813. When the pressure sensor 1813 is disposed at the lower layer of the display screen 1805, the processor 1801 controls an operable control on the UI interface according to a pressure operation of the user on the display screen 1805. The operable control includes at least one of a button control, a scroll-bar control, an icon control and a menu control.

The fingerprint sensor 1814 is configured to collect a user's fingerprint, and the processor 1801 identifies a user's identity according to the fingerprint collected by the fingerprint sensor 1814, or the fingerprint sensor 1814 identifies the user's identity according to the collected fingerprint. When identifying that the user's identity is a trusted identity, the processor 1801 authorizes the user to perform related sensitive operations. The sensitive operations include: unlocking the screen, viewing encrypted information, downloading software, paying, changing a setting, and the like. The fingerprint sensor 1814 may be disposed on a front, back, or side surface of the terminal 1800. When a physical button or a vendor logo is disposed on the terminal 1800, the fingerprint sensor 1814 may be integrated with the physical button or the vendor logo.

The optical sensor 1815 is configured to collect ambient light intensity. In an embodiment, the processor 1801 may control display brightness of the display screen 1805 according to the ambient light intensity collected by the optical sensor 1815. Specifically, when the ambient light intensity is relatively high, the display brightness of the display screen 1805 is turned up. When the ambient light intensity is relatively low, the display brightness of the display screen 1805 is turned down. In another embodiment, the processor 1801 may further dynamically adjust a photographing parameter of the camera component 1806 according to the ambient light intensity collected by the optical sensor 1815.

The proximity sensor 1816, also referred to as a distance sensor, is generally disposed on the front panel of the terminal 1800. The proximity sensor 1816 is configured to collect a distance between the user and the front surface of the terminal 1800. In an embodiment, when the proximity sensor 1816 detects that the distance between the user and the front surface of the terminal 1800 gradually becomes smaller, the display screen 1805 is controlled by the processor 1801 to switch from a screen-on state to a screen-off state. When the proximity sensor 1816 detects that the distance between the user and the front surface of the terminal 1800 gradually becomes larger, the display screen 1805 is controlled by the processor 1801 to switch from the screen-off state to the screen-on state.

A person skilled in the art may understand that a structure shown in FIG. 18 constitutes no limitation on the terminal 1800, and the terminal may include more or fewer components than those shown in the figure, or some components may be combined, or a different component deployment may be used.

A person of ordinary skill in the art may understand that all or some of the steps of the methods in the embodiments may be implemented by a program instructing relevant hardware. The program may be stored in a non-transitory computer-readable storage medium. The computer-readable storage medium may be a computer-readable storage medium included in the memory in the foregoing embodiments, or may be a computer-readable storage medium that exists alone and is not fitted into a terminal. The computer-readable storage medium stores at least one instruction, at least one program, a code set or an instruction set, the at least one instruction, the at least one program, the code set or the instruction set being loaded and executed by the processor to implement the method for selecting an accessory in a virtual environment according to any one of FIG. 5, FIG. 10, and FIG. 13 to FIG. 15.

Optionally, the computer-readable storage medium may include: a read-only memory (ROM), a RAM, a solid state drive (SSD), an optical disc, or the like. The random access memory may include a resistance random access memory (ReRAM) and a dynamic random access memory (DRAM). The sequence numbers of the foregoing embodiments of this application are merely for description purpose but do not indicate the preference of the embodiments.

A person of ordinary skill in the art may understand that all or some of the steps of the foregoing embodiments may be implemented by using hardware, or may be implemented by a program instructing relevant hardware. The program may be stored in a non-transitory computer-readable storage medium. The storage medium may be a ROM, a magnetic disk, an optical disc, or the like. The foregoing descriptions are merely exemplary embodiments of this application, but are not intended to limit this application. Any modification, equivalent replacement, or improvement made within the spirit and principle of this application shall fall within the protection scope of this application.

What is claimed is:

1. A method for selecting an accessory in a virtual environment, applied to a terminal having a processor and memory storing a plurality of programs to be executed by the processor, the method comprising:
   displaying a first virtual environment interface, the first virtual environment interface including a picture of the virtual environment observed by a virtual object and an accessory switching control, and the virtual object holding a virtual gun in the virtual environment;
   receiving a trigger operation on the accessory switching control by a user of the terminal;
   in response to the trigger operation, generating a candidate accessory zone in a local peripheral region of the accessory switching control and displaying n gun accessories of one accessory type in the candidate accessory zone, each gun accessory being an accessory that has been obtained by the virtual object and that is used for being fitted on the virtual gun, the gun accessory being fitted in a slot corresponding to the accessory type on the virtual gun, and n being a positive integer, wherein the candidate accessory zone containing the n gun accessories is displayed in the first virtual environment interface in response to the trigger operation;
   receiving a drag operation following the trigger operation by the user of the terminal, wherein a start position of the drag operation is a first display position corresponding to the accessory switching control and an end position of the drag operation is a second display position corresponding to the target gun accessory; and
   receiving a drag end operation at the second display position by the user of the terminal, wherein the drag end operation triggers a selection operation on the target gun accessory; and
   replacing the first virtual environment interface with a second virtual environment interface according to the selection operation, the second virtual environment interface comprising a picture of the virtual environment observed by the virtual object, the virtual object holding the virtual gun, and the target gun accessory being fitted in a target slot of the virtual gun.

2. The method according to claim 1, wherein in response to the trigger operation, the generating a candidate accessory zone in a local peripheral region of the accessory switching control comprises:
   generating, in response to the trigger operation, a sectorial area panel in the local peripheral region with the accessory switching control at a center, the sectorial area panel comprising m candidate boxes, the n gun accessories being displayed in n of the m candidate boxes, and m≥n.

3. The method according to claim 2, wherein the candidate accessory zone displays the n gun accessories according to one selected from the group consisting of how often the virtual object uses the gun accessories; fitting degrees between the virtual gun and the gun accessories; a preset display order; and an order of picking up the gun accessories by the virtual object.

4. The method according to claim 1, wherein the receiving a trigger operation on the accessory switching control comprises:
receiving a press operation on the accessory switching control.

5. The method according to claim 1, wherein the target slot is a slot for fitting a scope, a first scope is fitted in the target slot of the virtual gun in a process of displaying the first virtual environment interface, and the target gun accessory is a second scope;
the displaying a first virtual environment interface further comprises:
receiving a scope opening operation, the scope opening operation being used for observing the virtual environment by using the first scope in the target slot; and displaying the first virtual environment interface according to the scope opening operation, the first virtual environment interface comprising the virtual environment displayed magnified at a magnification of the first scope; and
the replacing the first virtual environment interface with the second virtual environment interface according to the selection operation comprises:
replacing the first virtual environment interface with the second virtual environment interface according to the selection operation, the second virtual environment interface comprising the virtual environment displayed magnified at a magnification of the second scope.

6. The method according to claim 1, wherein the candidate accessory zone further comprises an accessory removal control configured to remove the gun accessory in the target slot; and
the method further comprises:
receiving a control selection operation on the accessory removal control; and
replacing the first virtual environment interface with a third virtual environment interface according to the control selection operation, the third virtual environment interface comprising a picture of the virtual environment observed by the virtual object, the virtual object holding the virtual gun, and no gun accessory being fitted in the target slot of the virtual gun.

7. The method according to claim 6, wherein the target slot is a slot for fitting a scope, and a first scope is fitted in the target slot of the virtual gun in a process of displaying the first virtual environment interface;
the displaying a first virtual environment interface comprises:
receiving a scope opening operation, the scope opening operation being used for observing the virtual environment by using the first scope in the target slot; and displaying the first virtual environment interface according to the scope opening operation, the first virtual environment interface comprising the virtual environment displayed magnified at a magnification of the first scope; and
the replacing the first virtual environment interface with a third virtual environment interface according to the control selection operation comprises:
replacing the first virtual environment interface with the third virtual environment interface according to the control selection operation, the third virtual environment interface comprising a picture of the virtual environment observed by using a mechanical scope corresponding to the virtual gun.

8. A terminal, comprising a processor and a memory, the memory storing a plurality of programs that, when executed by the processor, cause the terminal to perform a plurality of operations including:
displaying a first virtual environment interface, the first virtual environment interface including a picture of a virtual environment observed by a virtual object and an accessory switching control, and the virtual object holding a virtual gun in the virtual environment;
receiving a trigger operation on the accessory switching control by a user of the terminal;
in response to the trigger operation, generating a candidate accessory zone in a local peripheral region of the accessory switching control and displaying n gun accessories of one accessory type in the candidate accessory zone, each gun accessory being an accessory that has been obtained by the virtual object and that is used for being fitted on the virtual gun, the gun accessory being fitted in a slot corresponding to the accessory type on the virtual gun, and n being a positive integer, wherein the candidate accessory zone containing the n gun accessories is displayed in the first virtual environment interface in response to the trigger operation;
receiving a drag operation following the trigger operation by the user of the terminal, wherein a start position of the drag operation is a first display position corresponding to the accessory switching control and an end position of the drag operation is a second display position corresponding to the target gun accessory; and
receiving a drag end operation at the second display position by the user of the terminal, wherein the drag end operation triggers a selection operation on the target gun accessory; and
replacing the first virtual environment interface with a second virtual environment interface according to the selection operation, the second virtual environment interface comprising a picture of the virtual environment observed by the virtual object, the virtual object holding the virtual gun, and the target gun accessory being fitted in a target slot of the virtual gun.

9. The terminal according to claim 8, wherein in response to trigger operation, the generating a candidate accessory zone in a local peripheral region of the accessory switching control comprises:
generating, in response to the trigger operation, a sectorial area panel in the local peripheral region with the accessory switching control at a center, the sectorial area panel comprising m candidate boxes, the n gun accessories being displayed in n of the m candidate boxes, and m≥n.

10. The terminal according to claim 9, wherein the candidate accessory zone displays the n gun accessories according to one selected from the group consisting of how often the virtual object uses the gun accessories; fitting degrees between the virtual gun and the gun accessories; a preset display order; and an order of picking up the gun accessories by the virtual object.

11. The terminal according to claim 8, wherein the receiving a trigger operation on the accessory switching control comprises:

receiving a press operation on the accessory switching control.

12. The terminal according to claim 8, wherein the target slot is a slot for fitting a scope, a first scope is fitted in the target slot of the virtual gun in a process of displaying the first virtual environment interface, and the target gun accessory is a second scope;

the displaying a first virtual environment interface further comprises:
receiving a scope opening operation, the scope opening operation being used for observing the virtual environment by using the first scope in the target slot; and displaying the first virtual environment interface according to the scope opening operation, the first virtual environment interface comprising the virtual environment displayed magnified at a magnification of the first scope; and
the replacing the first virtual environment interface with a second virtual environment interface according to the selection operation comprises:
replacing the first virtual environment interface with the second virtual environment interface according to the selection operation, the second virtual environment interface comprising the virtual environment displayed magnified at a magnification of the second scope.

13. The terminal according to claim 8, wherein the candidate accessory zone further comprises an accessory removal control configured to remove the gun accessory in the target slot; and the plurality of operations further comprise:
receiving a control selection operation on the accessory removal control; and
replacing the first virtual environment interface with a third virtual environment interface according to the control selection operation, the third virtual environment interface comprising a picture of the virtual environment observed by the virtual object, the virtual object holding the virtual gun, and no gun accessory being fitted in the target slot of the virtual gun.

14. The terminal according to claim 13, wherein the target slot is a slot for fitting a scope, and a first scope is fitted in the target slot of the virtual gun in a process of displaying the first virtual environment interface;

the displaying a first virtual environment interface comprises:
receiving a scope opening operation, the scope opening operation being used for observing the virtual environment by using the first scope in the target slot; and displaying the first virtual environment interface according to the scope opening operation, the first virtual environment interface comprising the virtual environment displayed magnified at a magnification of the first scope; and
the replacing the first virtual environment interface with a third virtual environment interface according to the control selection operation comprises:
replacing the first virtual environment interface with the third virtual environment interface according to the control selection operation, the third virtual environment interface comprising a picture of the virtual environment observed by using a mechanical scope corresponding to the virtual gun.

15. A non-transitory computer-readable storage medium, storing a plurality of programs that, when executed by a processor of a terminal, cause the terminal to perform a plurality of operations including:

displaying a first virtual environment interface, the first virtual environment interface including a picture of a virtual environment observed by a virtual object and an accessory switching control, and the virtual object holding a virtual gun in the virtual environment;
receiving a trigger operation on the accessory switching control by a user of the terminal;
in response to the trigger operation, generating a candidate accessory zone in a local peripheral region of the accessory switching control and displaying n gun accessories of one accessory type in the candidate accessory zone, each gun accessory being an accessory that has been obtained by the virtual object and that is used for being fitted on the virtual gun, the gun accessory being fitted in a slot corresponding to the accessory type on the virtual gun, and n being a positive integer, wherein the candidate accessory zone containing the n gun accessories is displayed in the first virtual environment interface in response to the trigger operation;
receiving a drag operation following the trigger operation by the user of the terminal, wherein a start position of the drag operation is a first display position corresponding to the accessory switching control and an end position of the drag operation is a second display position corresponding to the target gun accessory; and
receiving a drag end operation at the second display position by the user of the terminal, wherein the drag end operation triggers a selection operation on the target gun accessory; and
replacing the first virtual environment interface with a second virtual environment interface according to the selection operation, the second virtual environment interface comprising a picture of the virtual environment observed by the virtual object, the virtual object holding the virtual gun, and the target gun accessory being fitted in a target slot of the virtual gun.

16. The non-transitory computer-readable storage medium according to claim 15, wherein in response to the trigger operation, the generating a candidate accessory zone in a local peripheral region of the accessory switching control comprises:
generating, in response to the trigger operation, a sectorial area panel in the local peripheral region with the accessory switching control at a center, the sectorial area panel comprising m candidate boxes, the n gun accessories being displayed in n of the m candidate boxes, and m≥n.

17. The non-transitory computer-readable storage medium according to claim 16, wherein the candidate accessory zone displays the n gun accessories according to one selected from the group consisting of how often the virtual object uses the gun accessories;
fitting degrees between the virtual gun and the gun accessories; a preset display order; and an order of picking up the gun accessories by the virtual object.

18. The non-transitory computer-readable storage medium according to claim 15, wherein the receiving a trigger operation on the accessory switching control comprises:
receiving a press operation on the accessory switching control.

19. The non-transitory computer-readable storage medium according to claim 15, wherein the target slot is a slot for fitting a scope, a first scope is fitted in the target slot of the virtual gun in a process of displaying the first virtual environment interface, and the target gun accessory is a second scope;

the displaying a first virtual environment interface further comprises:
receiving a scope opening operation, the scope opening operation being used for observing the virtual environment by using the first scope in the target slot; and displaying the first virtual environment interface according to the scope opening operation, the first virtual environment interface comprising the virtual environment displayed magnified at a magnification of the first scope; and
the replacing the first virtual environment interface with a second virtual environment interface according to the selection operation comprises:
replacing the first virtual environment interface with the second virtual environment interface according to the selection operation, the second virtual environment interface comprising the virtual environment displayed magnified at a magnification of the second scope.

20. The non-transitory computer-readable storage medium according to claim 15, wherein the candidate accessory zone further comprises an accessory removal control configured to remove the gun accessory in the target slot; and the plurality of operations further comprise:
receiving a control selection operation on the accessory removal control; and
replacing the first virtual environment interface with a third virtual environment interface according to the control selection operation, the third virtual environment interface comprising a picture of the virtual environment observed by the virtual object, the virtual object holding the virtual gun, and no gun accessory being fitted in the target slot of the virtual gun.

* * * * *